(12) United States Patent
Takano et al.

(10) Patent No.: US 9,278,711 B2
(45) Date of Patent: Mar. 8, 2016

(54) VEHICLE

(71) Applicant: Yamaha Hatsudoki Kabushiki Kaisha, Iwata-shi, Shizuoka (JP)

(72) Inventors: Kazuhisa Takano, Shizuoka (JP); Shigeto Yamasaki, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 14/437,899

(22) PCT Filed: Oct. 24, 2013

(86) PCT No.: PCT/JP2013/078876
§ 371 (c)(1),
(2) Date: Apr. 23, 2015

(87) PCT Pub. No.: WO2014/065385
PCT Pub. Date: May 1, 2014

(65) Prior Publication Data
US 2015/0298735 A1   Oct. 22, 2015

(30) Foreign Application Priority Data

Oct. 25, 2012   (JP) .................................. 2012-235605

(51) Int. Cl.
*B60G 21/00*   (2006.01)
*B62D 9/02*    (2006.01)
(Continued)

(52) U.S. Cl.
CPC .............. *B62D 9/02* (2013.01); *B60G 17/0162* (2013.01); *B60G 17/08* (2013.01); *B60G 21/05* (2013.01);
(Continued)

(58) Field of Classification Search
USPC ............... 280/5.509, 93.502, 93.508, 93.511, 280/124.103; 180/210
See application file for complete search history.

(56) References Cited

U.S. PATENT DOCUMENTS 4,351,410 A * 9/1982 Townsend ................ B62D 9/02
                                                            180/210
4,740,004 A * 4/1988 McMullen ............... B62K 5/05
                                                          280/124.103
(Continued)

FOREIGN PATENT DOCUMENTS

CN        101379317 A      3/2009
CN        202414056 U      9/2012
(Continued)

OTHER PUBLICATIONS

Official Communication issued in corresponding European Patent Application No. 13849340.8, mailed on Sep. 18, 2015.
(Continued)

*Primary Examiner* — Toan To
(74) *Attorney, Agent, or Firm* — Keating & Bennett, LLP

(57) ABSTRACT

A vehicle includes a resisting force change mechanism that changes a resisting force exerted against a turning operation of each of an upper cross member and a lower cross member with respect to a body frame, and a resisting force that occurs when the upper cross member and the lower cross member are displaced from respective positions relative to the body frame in at least two different magnitudes. The resisting force change mechanism includes a first portion and a second portion that change a resisting force against a relative turning therebetween about a resisting force change axis which is parallel or substantially parallel with an upper middle axis. The first portion is non-turnably fixed to one member and the second portion is supported by another member, at least a portion of which is turnably supported by the one member, and the second portion turns relative to the first portion.

11 Claims, 18 Drawing Sheets

(51) Int. Cl.
- *B62K 5/05* (2013.01)
- *B62K 5/08* (2006.01)
- *B62K 21/00* (2006.01)
- *B60G 21/055* (2006.01)
- *B62K 3/00* (2006.01)
- *B60G 17/016* (2006.01)
- *B60G 17/08* (2006.01)
- *B60G 21/05* (2006.01)

(52) U.S. Cl.
CPC ............ *B60G 21/0553* (2013.01); *B62K 3/007* (2013.01); *B62K 5/05* (2013.01); *B62K 5/08* (2013.01); *B62K 21/00* (2013.01); *B60G 2200/44* (2013.01); *B60G 2204/82* (2013.01); *B60G 2204/83* (2013.01); *B60G 2300/12* (2013.01); *B60G 2300/122* (2013.01); *B60G 2300/45* (2013.01); *B60G 2800/012* (2013.01)

(56) References Cited

U.S. PATENT DOCUMENTS

| | | | |
|---|---|---|---|
| 6,367,824 B1 * | 4/2002 | Hayashi | B62K 5/05 280/124.103 |
| 7,073,806 B2 * | 7/2006 | Bagnoli | B62K 5/05 180/210 |
| D547,242 S | 7/2007 | Lambri | |
| 7,487,985 B1 * | 2/2009 | Mighell | B62K 5/027 180/210 |
| 8,016,302 B1 * | 9/2011 | Reeve | B62K 5/05 280/124.103 |
| 8,141,890 B2 * | 3/2012 | Hughes | B60G 21/007 180/210 |
| 8,419,027 B2 * | 4/2013 | Ting | B62K 5/02 280/124.103 |
| 8,818,700 B2 * | 8/2014 | Moulene | B62K 5/10 180/199 |
| 9,045,015 B2 * | 6/2015 | Spahl | B60G 17/00 |
| 2004/0046336 A1 | 3/2004 | Jensen et al. | |
| 2004/0140645 A1 | 7/2004 | Hayashi | |
| 2005/0167174 A1 | 8/2005 | Marcacci | |
| 2006/0151232 A1 | 7/2006 | Marcacci | |
| 2009/0050425 A1 | 2/2009 | Murakami et al. | |
| 2010/0194068 A1 | 8/2010 | Henderson | |
| 2010/0314852 A1 | 12/2010 | Chin et al. | |
| 2011/0006498 A1 * | 1/2011 | Mercier | B62D 9/02 280/124.103 |
| 2011/0233885 A1 | 9/2011 | McMillan | |
| 2011/0275256 A1 | 11/2011 | Gibbs et al. | |
| 2012/0285302 A1 | 11/2012 | Bergami | |
| 2014/0375015 A1 | 12/2014 | Yu | |

FOREIGN PATENT DOCUMENTS

| | | |
|---|---|---|
| DE | 10 2010 052 716 A1 | 6/2011 |
| EP | 1 666 346 A1 | 6/2006 |
| EP | 2 368 729 A1 | 9/2011 |
| JP | 59-153674 A | 9/1984 |
| JP | 2000-329168 A | 11/2000 |
| JP | 2002-337779 A | 11/2002 |
| JP | 2005-172096 A | 6/2005 |
| JP | 2005-313876 A | 11/2005 |
| JP | 2010-167999 A | 8/2010 |
| JP | 2010-184508 A | 8/2010 |
| JP | 2010-228551 A | 10/2010 |
| JP | 2011-524836 A | 9/2011 |
| TW | 201117997 A1 | 6/2011 |
| TW | 201200404 A1 | 1/2012 |
| WO | 2004/018241 A2 | 3/2004 |

OTHER PUBLICATIONS

Official Communication issued in International Patent Application No. PCT/JP2013/078876, mailed on Jan. 21, 2014.

Piaggio, "Catalogo Parti Di Ricambio", NTRC000U01, MP3 300 ie LT Mod. ZAPM64102, 116 pages.

Iizuka et al.; "Vehicle"; U.S. Appl. No. 14/430,357, filed Mar. 23, 2015.

Takano et al.; "Vehicle"; U.S. Appl. No. 14/437,893, filed Apr. 23, 2015.

* cited by examiner

VEHICLE

BACKGROUND OF THE INVENTION

1. Field of the Invention

The present invention relates to a vehicle equipped with a leanable body frame and two front wheels.

2. Description of the Related Art

A known vehicle includes a body frame that leans leftward or rightward while the vehicle is cornering and two front wheels that are aligned side by side in a left-and-right direction of the body frame (for example, refer to Japanese Patent Unexamined publication JP-A-2005-313876, German Patent Application No. 102010052716, U.S. Design Pat. D547, 242S, and Catalogo partidi ricambio, MP3 300 64102 ie LT Mod. ZAPM64102, Piaggio).

The vehicle including the body frame that can lean and the two front wheels includes a link mechanism. The link mechanism includes an upper cross member and a lower cross member. In addition, the link mechanism also includes a right side member which supports right end portions of the upper cross member and the lower cross member and a left side member which supports left end portions of the upper cross member and the lower cross member. The upper cross member and the lower cross member are supported on the body frame at their middle portions in front of a steering shaft. The upper cross member and the lower cross member are supported on the body frame so as to be turnable about axes extending substantially in a front-and-rear direction of the body frame. The upper cross member and the lower cross member turn relative to the body frame as the body frame leans, such that the relative positions of the two front wheels in an up-and-down of the body frame change. The upper cross member and the lower cross member are arranged above the two front wheels in the up-and-down direction of the body frame in an upright state of the body frame.

The vehicle including the body frame that can lean and the two front wheels includes a right shock absorbing device which supports the right front wheel so as to move in the up-and-down direction of the body frame and a left shock absorbing device which supports the left front wheel so as to move in the up-and-down direction of the body frame. The right shock absorbing device is supported on the right side member so as to turn about the axis of the right side member. The left shock absorbing device is supported on the left side member so as to turn about the axis of the left side member. Vehicles described in Japanese Patent Unexamined publication JP-A-2005-313876 and German Patent Application No. 102010052716 further include a handlebar, a steering shaft, and a turn transfer mechanism. The handlebar is fixed to the steering shaft. The steering shaft is supported on the body frame so as to turn relative thereto. When the handlebar is turned, the steering shaft also turns. The turn transfer mechanism transfers the turning motion of the steering shaft to the right shock absorbing device and the left shock absorbing device.

The vehicle including the body frame that can lean and the two front wheels includes a number of on-board components which are provided around the periphery of the steering shaft. The on-board components include lamps such as a headlamp, a radiator, a reservoir tank, electric components such as a horn, and a main switch of the vehicle, a storage box, a storage pocket and the like.

The vehicles described in Japanese Patent Unexamined publication JP-A-2005-313876 and German Patent Application No. 102010052716 include a resisting force change mechanism. The resisting force change mechanism suppresses the leaning of the body frame and the change in relative position of the two front wheels in the vertical direction of the body frame by increasing a resisting force against the operation of the link mechanism.

In the vehicle described in Japanese Patent Unexamined publication JP-A-2005-313876, the resisting force change mechanism includes a brake disc and a caliper. The brake disc is fixed to the upper cross member of the link mechanism. The caliper changes the resisting force that is exerted on the link mechanism by controlling the frictional force between the caliper and the brake disc. The caliper is attached to the body frame at a location above the upper cross member. The link mechanism operates when the resisting force exerted by the resisting force change mechanism is zero or small. When the resisting force exerted by the resisting force change mechanism is large, the operation of the link mechanism is suppressed or stopped. When the resisting force exerted by the resisting force change mechanism is zero or small, the brake disc and the upper cross member move together relative to the body frame.

In the vehicle described in German Patent Application No. 102010052716, the resisting force change mechanism includes a rod, a piston that is provided at one end of the rod, and a cylinder in which the piston moves. In the resisting force change mechanism, the rod extends or contracts in relation to the cylinder as a result of the piston moving within the cylinder. The rod stays stationary in relation to the cylinder as a result of the piston stopping within the cylinder. The other end of the rod is supported on the left member. The cylinder is supported on the body frame at a location above the upper cross member. The resisting force change mechanism changes the resisting force against the link mechanism by changing the moving state of the piston within the cylinder. The link mechanism operates when the resisting force exerted by the resisting force change mechanism is zero or small. When the resisting force exerted by the resisting force change mechanism is large, the operation of the link mechanism is suppressed or stopped. The rod and the cylinder also move as the link mechanism operates when the resisting force exerted by the resisting force change mechanism is zero or small.

The vehicles described in Japanese Patent Unexamined publication JP-A-2005-313876 and German Patent Application No. 102010052716 include a link mechanism that is located around the periphery of the steering shaft, and this link mechanism moves as the body frame leans. In addition, the vehicles include around the periphery of the steering shaft the resisting force change mechanism which operates as the body frame leans and the link mechanism operates. Because of this, in the vehicle including the body frame that can lean and the two front wheels, the resisting force change mechanism needs to be arranged so that the movable range of the link mechanism and the large movable range of the resisting force change mechanism do not interfere with each other. Further, in providing on-board components, it is necessary that the on-board components are arranged so as to avoid interference with both the movable range of the link mechanism and the movable range of the resisting force change mechanism. Because of this, in the vehicle including the body frame that can lean and the two front wheels, the construction around the periphery of the steering shaft tends to be large.

SUMMARY OF THE INVENTION

Preferred embodiments of the present invention provide a vehicle including a body frame that is capable of leaning and two front wheels that prevents enlargement of a peripheral construction of a steering shaft located above the two front wheels even though a function to suppress the operation of a link mechanism is provided.

According to a preferred embodiment of the present invention a vehicle includes a body frame; a right front wheel and a left front wheel aligned side by side in a left-and-right direction of the body frame; a right shock absorbing device supporting the right front wheel at a lower portion thereof and configured to absorb a displacement of the right front wheel in an up-and-down direction of the body frame in relation to an upper portion thereof; a left shock absorbing device supporting the left front wheel at a lower portion thereof and configured to absorb a displacement of the left front wheel in the up-and-down direction of the body frame in relation to an upper portion thereof; a link mechanism including a right side member supporting the upper portion of the right shock absorbing device so as to turn about a right steering axis extending in the up-and-down direction of the body frame, a left side member supporting the upper portion of the left shock absorbing device so as to turn about a left steering axis parallel or substantially parallel to the right steering axis, an upper cross member supporting an upper portion of the right side member at a right end portion thereof so as to turn about an upper right axis extending in a front-and-rear direction of the body frame, supporting an upper portion of the left side member at a left end portion thereof so as to turn about an upper left axis parallel or substantially parallel to the upper right axis, and supported on the body frame at a middle portion thereof so as to turn about an upper middle axis parallel or substantially parallel to the upper right axis and the upper left axis; and a lower cross member supporting a lower portion of the right side member at a right end portion thereof so as to turn about a lower right axis parallel or substantially parallel to the upper right axis, supporting a lower portion of the left side member at a left end portion thereof so as to turn about a lower left axis parallel or substantially parallel to the upper left axis, and supported on the body frame at a middle portion thereof so as to turn about a lower middle axis parallel or substantially parallel to the upper middle axis; a steering shaft supported on the body frame between the right side member and the left side member in the left-and-right direction of the body frame, and including an upper end portion provided above the lower middle axis in the up-and-down direction of the body frame and configured to turn about a middle steering axis extending in the up-and-down direction of the body frame; a handlebar provided at the upper end portion of the steering shaft; a turn transfer mechanism configured to transfer a turning motion of the steering shaft according to an operation of the handlebar to the right shock absorbing device and to the left shock absorbing device; and a resisting force change mechanism configured to change a resisting force exerted against turning operations of the upper cross member and the lower cross member with respect to the body frame, and to change a resisting force which occurs when the upper cross member and the lower cross member are displaced from respective positions relative to the body frame in at least two different magnitudes; wherein the resisting force change mechanism includes a first portions and a second portion that turn relative to each other about a resisting force change axis parallel or substantially parallel with the upper middle axis and configured to change a resisting force against the relative turning, the first portion is non-turnably fixed to one member of the right side member, the left side member, the upper cross member, the lower cross member and the body frame, and the second portion is supported by the other member of the right side member, the left side member, the upper cross member, the lower cross member, and the body frame, at least a portion of which is turnably supported by the one member, and the second portion is configured to turn relative to the first portion about the resisting force change axis in synchronization with a turning of the one member relative to the other member.

According to the configuration described above, the vehicle includes the resisting force change mechanism configured to change a resisting force exerted against a turning operation of each of the upper and lower cross members with respect to the body frame, and to change a resisting force which occurs when the upper cross member and the lower cross member are displaced from respective positions relative to the body frame in at least two different magnitudes.

The resisting force change mechanism includes the first and second portions that turn relative to each other about the resisting force change axis parallel or substantially parallel with an upper middle axis and that change the resisting force against the relative turning.

The first portion is non-turnably fixed to one member of the right side member, the left side member, the upper cross member, the lower cross member, and the body frame.

The second portion is supported by the other member of the right side member, the left side member, the upper cross member, the lower cross member, and the body frame, at least a portion of which is turnably supported by the one member. The second portion is configured to turn relative to the first portion about the resisting force change axis in synchronization with the turning of the one member relative to the other member.

According to the configuration described above, the second portion turns relative to the first portion about the resisting force change axis which is parallel or substantially parallel with the upper middle axis. The resisting force change mechanism is configured to change a resisting force against the relative turning between the first and second portions about the resisting force change axis which is parallel or substantially parallel with the upper middle axis. Since the first and second portions of the resisting force change mechanism are disposed on a circumference of the resisting force change axis, the resisting force change mechanism is unlikely to increase in size as seen in a direction along the upper middle axis.

The first portion is fixed to the body frame, or one member of a link mechanism that turns relative to the body frame. The second portion is supported by the other member that is turnably supported by the one member. The one member and the other member of the link mechanism are disposed close to each other. For this reason, it is possible to dispose the first and second portions of the resisting force change mechanism close to each other and it is possible to make the resisting force change mechanism compact.

The upper cross member, the lower cross member, the right side member, and the left side member of the link mechanism turn with respect to the body frame about an axis which is parallel or substantially parallel with the upper middle axis. Each of the first and second portions of the resisting force change mechanism is supported by any one of the upper cross member, the lower cross member, the right side member, the left side member, and the body frame. Since a movement direction of the members of the link mechanism is parallel or substantially parallel with a movement direction of the resisting force change mechanism, the resisting force change mechanism is prevented from interfering with the link mechanism.

For this reason, it is possible to prevent interference between the resisting force change mechanism and the link mechanism, and it is possible to prevent an increase in size of the vehicle even when equipped with the resisting force change mechanism.

Furthermore, the first portion is fixed to the body frame, or one configuration member of the link mechanism that turns relative to the body frame. The second portion is supported by the other member of the link mechanism. The first portion turns relative to the second portion in synchronization with the relative turning between the one member and the other member of the link mechanism.

The link mechanism includes the members which turn relative to each other. Since the first and second portions are respectively provided on the members of the link mechanism, the first and second portions turn relative to each other in synchronization with a turning operation of the link mechanism. Accordingly, the resisting force change mechanism changes a resisting force against the relative turning between the first and second portions by using the turning operation of the link mechanism. For this reason, it is possible to simplify the structure of the resisting force change mechanism and it is possible to make the resisting force change mechanism compact.

According to a preferred embodiment of the present invention, the resisting force change axis preferably coincides with a turning axis of the one member and the other member.

According to the configuration described above, since the resisting force change axis coincides with a turning axis of the one member and the other member as seen in the direction of the upper middle axis, it is possible to make the resisting force change mechanism compact.

According to a preferred embodiment of the present invention, the one member preferably includes a shaft portion that turnably supports the other member about the turning axis which is parallel or substantially parallel with the upper middle axis and the first portion is preferably fixed to the shaft portion.

According to the configuration described above, the shaft portion of the one member includes two functions: a function of supporting the other member and a function of working as a fixing portion to which the first portion is fixed to, thus it is easy to make the link mechanism and the resisting force change mechanism compact.

According to a preferred embodiment of the present invention, the first portion preferably includes a first surface that extends in a direction of the resisting force change axis, the second portion preferably includes a second surface that extends in the direction of the resisting force change axis and that faces the first surface, and the resisting force change mechanism is configured to change the resisting force between the first surface and the second surface.

According to the configuration described above, as seen in the direction of the upper middle axis, it is possible to make the first and second portions compact and to make the resisting force change mechanism compact. It is possible to secure a large resisting force while maintaining the size as seen in the direction of the upper middle axis by extending the first and second surfaces in a direction of the resisting force change axis.

According to a preferred embodiment of the present invention, at least a portion of each of the first and second surfaces is preferably arc shaped or substantially arc shaped when seen in a direction of the upper middle axis.

According to the configuration described above, since each of the first and second surfaces preferably includes an arc shape or a substantially arc shape, the resisting force change mechanism is unlikely to interfere with the link mechanism or the like, and it is possible to make the link mechanism compact and the circumference of the steering shaft small.

According to a preferred embodiment of the present invention, each of the first and second surfaces preferably includes a circular shape or substantially circular shape when seen in the direction of the upper middle axis.

According to the configuration described above, since each of the first and second surfaces includes a circular shape or a substantially circular shape, the resisting force change mechanism is unlikely to interfere with the link mechanism or the like, and it is possible to make the link mechanism compact and the circumference of the steering shaft small.

According to a preferred embodiment of the present invention, the resisting force change mechanism preferably overlaps the steering shaft when seen in the direction of the upper middle axis.

According to the configuration described above, since the steering shaft is located at the center in a width direction of the vehicle, the resisting force change mechanism is also positioned at the center in the width direction of the vehicle. For this reason, the resisting force change mechanism is unlikely to protrude outward from a movable range of the link mechanism as seen in the direction of the upper middle axis.

According to a preferred embodiment of the present invention, a magnetic fluid in which a shearing resisting force changes is preferably retained between the first and second portions.

According to a preferred embodiment of the present invention, the resisting force change mechanism preferably includes a first fluid chamber, of which a volume is changed corresponding to a relative turning between the first and second portions, and a second fluid chamber that communicates with the first fluid chamber via a communication path, and a movement of the fluid between the first and second fluid chambers is preferably controlled by adjusting a degree of opening and closing of the communication path, thus changing the resisting force against a relative turning between the first and second portions.

According to a preferred embodiment of the present invention, the resisting force change mechanism preferably includes a drum brake mechanism, wherein the second portion includes a drum and the first portion includes a shoe provided inside the drum and configured to come into contact with an inner circumferential surface of the drum.

According to the configuration described above, since the resisting force change mechanism includes a drum brake mechanism, it is possible to use a self-servo action. For this reason, the resisting force change mechanism is made compact while also being able to supply a large resisting force.

According to a preferred embodiment of the present invention, a plurality of the resisting force change mechanisms is preferably provided.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
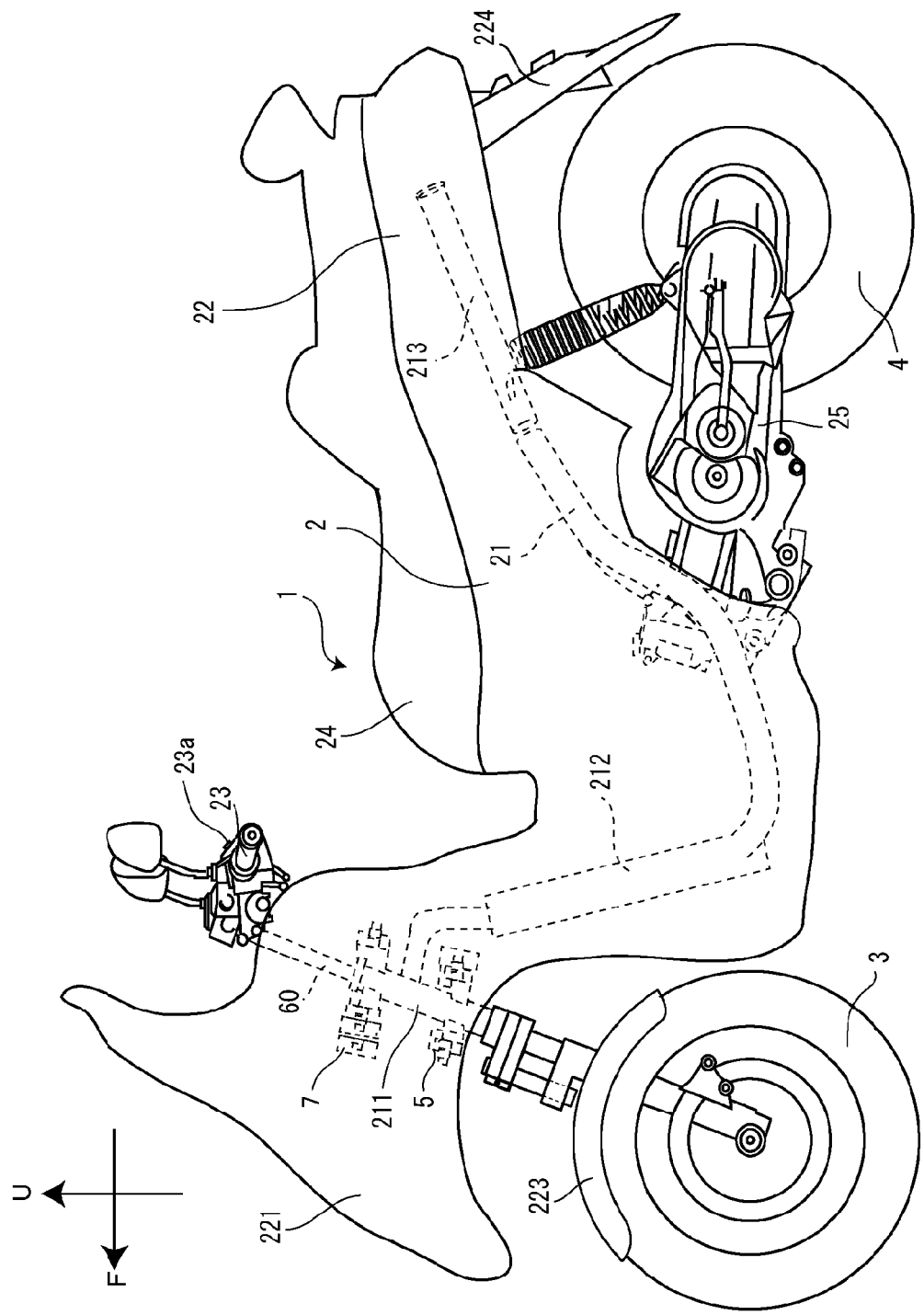
FIG. 1 is a left side view showing a three-wheeled vehicle according to a first preferred embodiment of the present invention.

Hereinafter, three-wheeled vehicles which are one type of a vehicle according to preferred embodiments of the present invention will be described with reference to the accompanying drawings.

First Preferred Embodiment

A vehicle 1 according to a first preferred embodiment of the present invention will be described with reference to FIGS. 1 to 10B. Like reference numerals will be given to like or corresponding elements and similar descriptions thereof will not be repeated. In the following description, an arrow F in the drawings denotes a forward direction of the vehicle 1. An arrow R in the drawings denotes a rightward direction of the vehicle 1. An arrow L in the drawings denotes a leftward direction of the vehicle 1. An arrow U denotes a vertically upward direction. An outward direction of the vehicle width direction denotes a direction directed to the left or right from a center of the vehicle width direction.

FIG. 1 is a side view of the entire vehicle 1. In the following description, when front, rear, left and right are referred to with a view to showing directions, they denote front, rear, left, and right as seen from a rider on the vehicle 1.

The vehicle 1 includes a vehicle main body 2, front wheels 3, and a rear wheel 4. The vehicle main body 2 includes a body frame 21, a body cover 22, a handlebar 23, a seat 24, and a power unit 25.

The body frame 21 supports the power unit 25, the seat 24, and the like. The power unit 25 includes an engine, a transmission, and the like. In FIG. 1, the body frame 21 is shown by broken lines.

The body frame 21 includes a headpipe 211, a down frame 212, and a rear frame 213. The headpipe 211 is disposed in a front portion of the vehicle. A link mechanism 5 is disposed around the periphery of the headpipe 211. A steering shaft 60 is inserted into the headpipe 211 so as to turn therein. The steering shaft 60 extends substantially in an up-and-down direction (the direction of a middle steering axis). The handlebar 23 is provided at an upper end portion of the steering shaft 60. The down frame 212 is inclined downward from a front end thereof to the rear. The rear frame 213 supports the seat 24, a tail lamp, and the like. A switch 23a is mounted on the handle 23.

The body frame 21 is covered with the body cover 22. The body cover 22 includes a front cover 221, front fenders 223, and a rear fender 224.

The front cover 221 is located in front of the seat 24. The front cover 221 covers the headpipe 211 and the link mechanism 5.

The front fenders 223 are disposed individually directly above a pair of left and right front wheels 3. The front fenders 223 are disposed directly below the front cover 221. The rear fender 224 is disposed directly above the rear wheel 4.

The front wheels 3 are located below the headpipe 211 and the link mechanism 5. The front wheels 3 are disposed directly below the front cover 221. The rear wheel 4 is disposed directly below the body cover 22.

Figure 2:
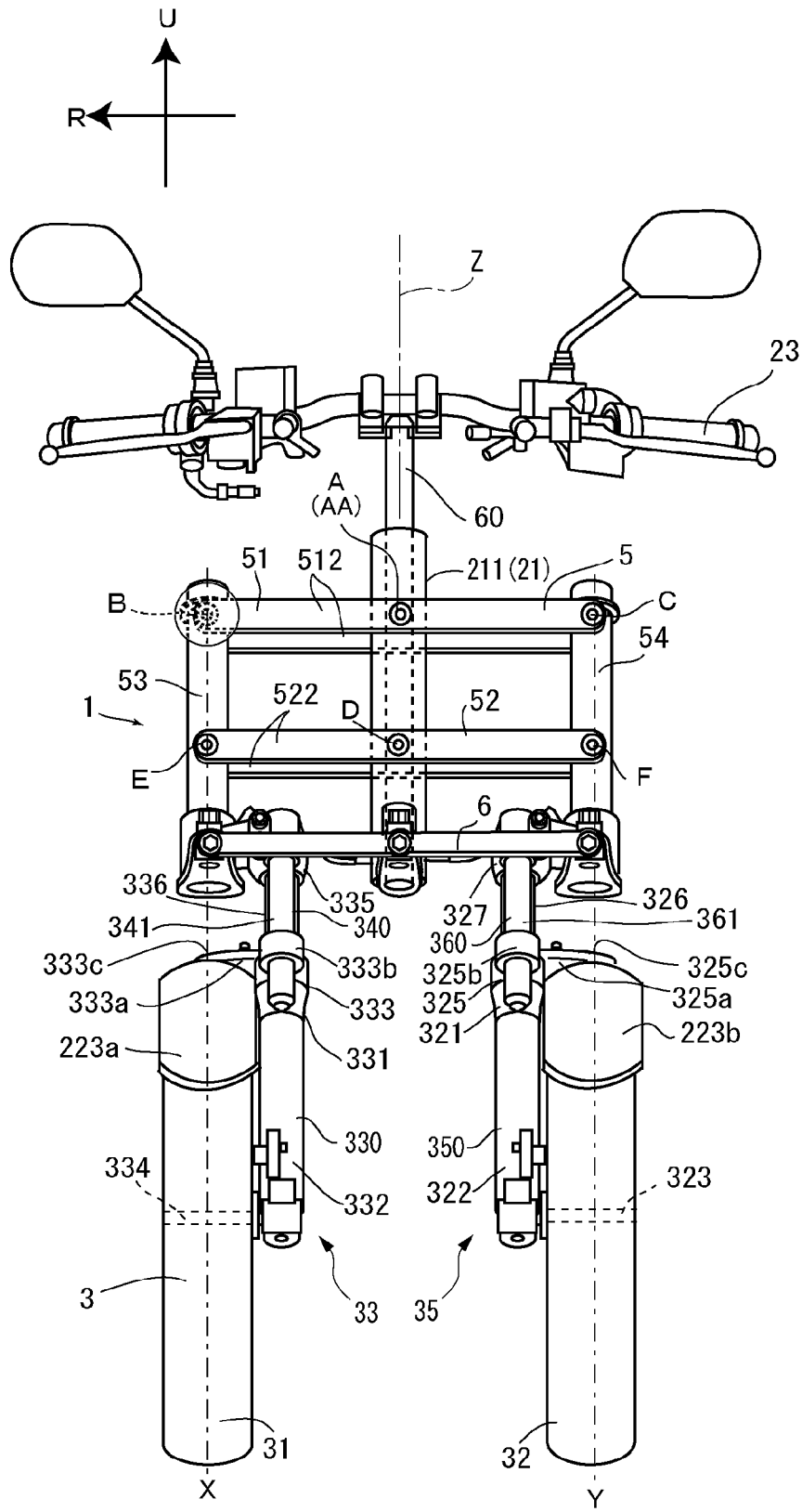
FIG. 2 is a front view showing the three-wheeled vehicle with a body cover removed.

FIG. 2 is an overall front view of the vehicle 1 with the body cover 22 removed. In FIG. 2, the down frame 212 is omitted.

The vehicle 1 includes the handlebar 23, the steering shaft 60, the headpipe 211, the pair of left and right front wheels 3, a first shock absorbing device 33, a first turn preventing mechanism 340, a second shock absorbing device 35, a second turn preventing mechanism 360, the link mechanism 5, an operation force transfer mechanism 6, and a resisting force change mechanism 7.

The front wheels 3 include a first front wheel 31 and a second front wheel 32 disposed side by side in a left-and-right direction of the body frame 21. The first front wheel 31, which is an example of a right front wheel, is disposed on a right side in relation to a center of the vehicle width direction. A first front fender 223a is disposed directly above the first front wheel 31. The second front wheel 32, which is an example of a left front wheel, is disposed on a left side in relation to the center of the vehicle width direction. A second front fender 223b is disposed directly above the second front wheel 32. The second front wheel 32 is symmetrical with the first front wheel 31 in relation to the left-and-right direction of the body frame 21. In this description, the "left-and-right direction of the body frame 21" denotes a direction which is perpendicular or substantially perpendicular to the direction of an axis of the headpipe 211 when the vehicle 1 is seen from the front thereof.

The first shock absorbing device 33, which is an example of a right shock absorbing device, supports the first front wheel 31 at a lower portion thereof and absorbs a displacement of the first front wheel 31 in an up-and-down direction of the body frame 21 in relation to an upper portion thereof. The first shock absorbing device 33 includes a first shock absorber 330 and a first turn preventing mechanism 340. In this description, the "up-and-down direction of the body frame 21" denotes a direction that follows the direction of the axis of the headpipe 211 when the vehicle 1 is seen from the front thereof.

The second shock absorbing device 35, which is an example of a left shock absorbing device, supports the second front wheel 32 at a lower portion thereof and absorbs a displacement of the second front wheel 32 in the up-and-down direction of the body frame 21 in relation to an upper portion thereof. The second shock absorbing device 35 includes a second shock absorber 350 and a second turn preventing mechanism 360.

Figure 3:
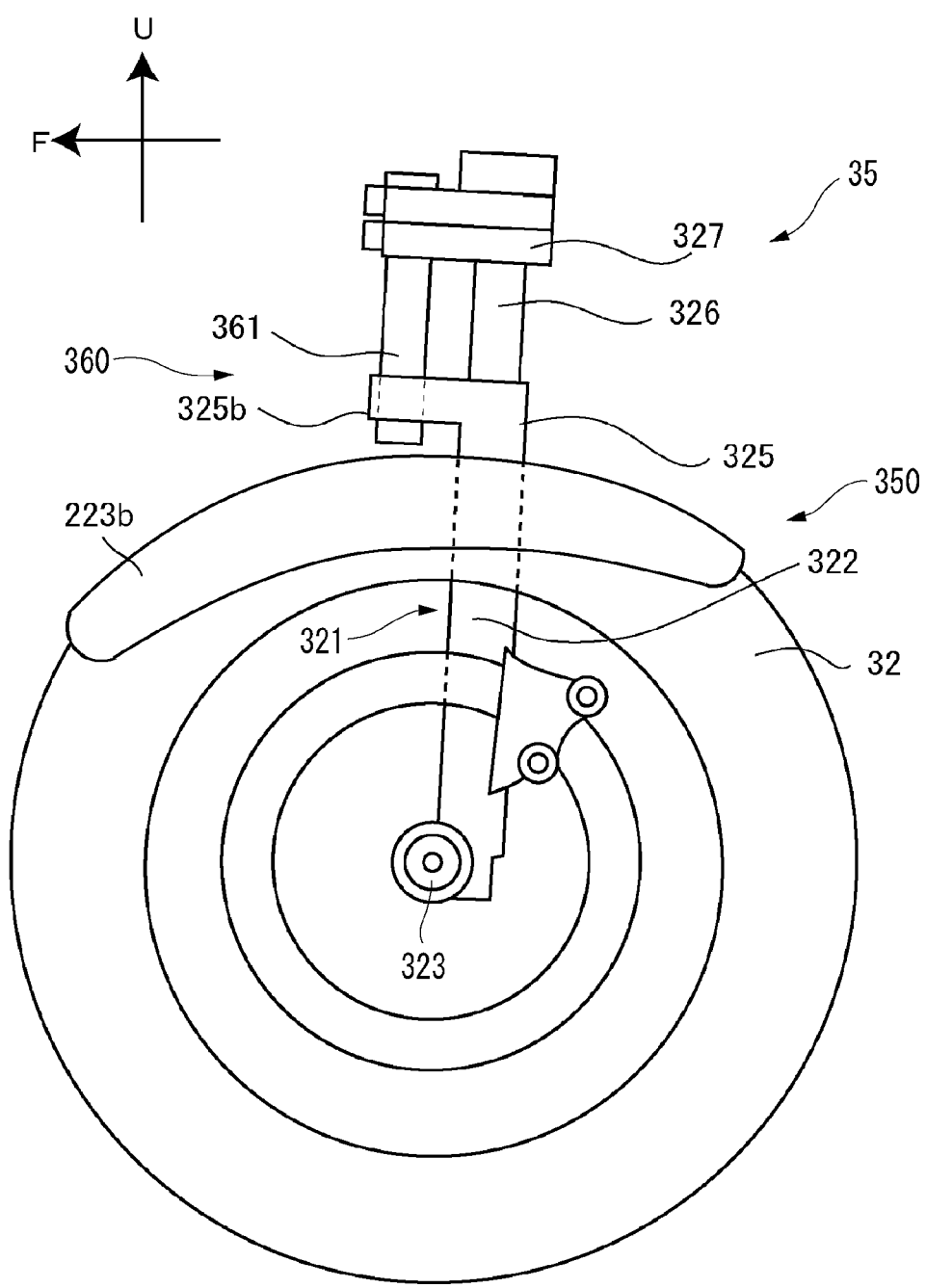
FIG. 3 is a left side view showing a relationship between a second front wheel and a second shock absorbing device in the three-wheeled vehicle in FIG. 1.

FIG. 3 is a left side view showing a relationship between the second front wheel 32 and the second shock absorbing device 35.

The second shock absorber 350 includes a second support member 321. The second support member 321 includes a second outer tube 322, a second support shaft 323, and a second inner tube 326. A portion of the second inner tube 326 is inserted in an inner circumferential side of the second outer tube 322. The second inner tube 326 is disposed directly above the second outer tube 322. The second inner tube 326 is movable relative to the second outer tube 322 in a direction in which the second outer tube 322 extends. The second shock absorber 350 is preferably a so-called telescopic shock absorber, for example.

The second turn preventing mechanism 360 prevents the turning of the second outer tube 322 in relation to the second inner tube 326. The second turn preventing mechanism 360 includes a second guide 325, a second turn preventing rod 361, and a second bracket 327. The second guide 325 guides the moving direction of the second turn preventing rod 361. The second guide 325 includes a second guide tube 325b. The second turn preventing rod 361 is inserted into an inner circumferential side of the second guide tube 325b. The second turn prevention rod 361 moves relative to the second guide tube 325b. The second turn preventing rod 361 prevents the relative turning of the second front wheel 32 with respect to the second inner tube 326. The second turn preventing rod 361 is parallel or substantially parallel to the second shock absorber 350. An upper end of the second turn preventing rod 361 and an upper end of the second inner tube 326 are fixed to the second bracket 327. This configuration prevents the relative turning of the second turn preventing rod 361 with respect to the second inner tube 326.

As shown in FIG. 2, the second front wheel 32 is supported by the second support member 321. The second front wheel 32 is connected to a lower portion of the second support member 321. The second support shaft 323 is provided at a lower end of the second outer tube 322 and supports the second front wheel 32. The second guide 325 includes a second plate 325a. The second plate 325a extends to above the second front fender 223b. The second front wheel 32 turns about a second center axis Y to change its orientation. The second center axis Y intersects the second plate 325a at a second connection point 325c.

The first shock absorber 330 includes a first support member 331. The first support member 331 includes a first outer tube 332, a first support shaft 334, and a first inner tube 336. The first shock absorber 330 preferably has a similar configuration to that of the second shock absorber 350 that is described with reference to FIG. 3. Namely, a portion of the first inner tube 336 is inserted in an inner circumferential side of the first outer tube 332. The first inner tube 336 is disposed directly above the first outer tube 332. The first inner tube 336 moves relative to the first outer tube 332 in a direction in which the first outer tube 332 extends. The first shock absorber 330 is preferably a so-called telescopic shock absorber, for example.

The first turn preventing mechanism 340 prevents the turning of the first outer tube 332 in relation to the first inner tube 336. The first turn preventing mechanism 340 preferably has a similar configuration to that of the second turn preventing mechanism 360 that is described with reference to FIG. 3. Namely, the first turn preventing mechanism 34 includes a first guide 333, a first turn preventing rod 341, and a first bracket 335. The first guide 333 guides the moving direction of the first turn preventing rod 341. The first guide 333 includes a first guide tube 333b. A first turn preventing rod 341 is inserted into an inner circumferential side of the first guide tube 333b. The first turn preventing rod 341 moves relative to the first guide tube 333b. The first turn prevention rod 341 prevents the relative turning of the first front wheel 31 in relation to the first inner tube 336. The first turn preventing rod 341 is parallel or substantially parallel to the first shock absorber 330. Upper ends of the first turn preventing rod 341 and the first inner tube 336 are fixed to the first bracket 335. This configuration prevents the relative turning of the first turn preventing rod 341 with respect to the first inner tube 336.

The first front wheel 31 is supported on the first support member 331. The first front wheel 31 is connected to a lower portion of the first support member 331. The first support shaft 334 is provided at a lower end of the first outer tube 332 and supports the first front wheel 31. The first guide 333 includes a first plate 333a. The first plate 333a extends to above the first front fender 223a. The first front wheel 31 turns about a first center axis X to change its orientation. The first center axis X intersects the first plate 333a at a first connection point 333c.

The link mechanism 5 is disposed below the handlebar 23. The link mechanism 5 is disposed above the first front wheel 31 and the second front wheel 32. The link mechanism 5 is connected to the headpipe 211. The link mechanism 5 includes a first cross member 51 (an example of an upper cross member), a second cross member 52 (an example of a lower cross member), a first side member 53 (an example of a right side member), and a second side member 54 (an example of a left side member).

Figure 4:
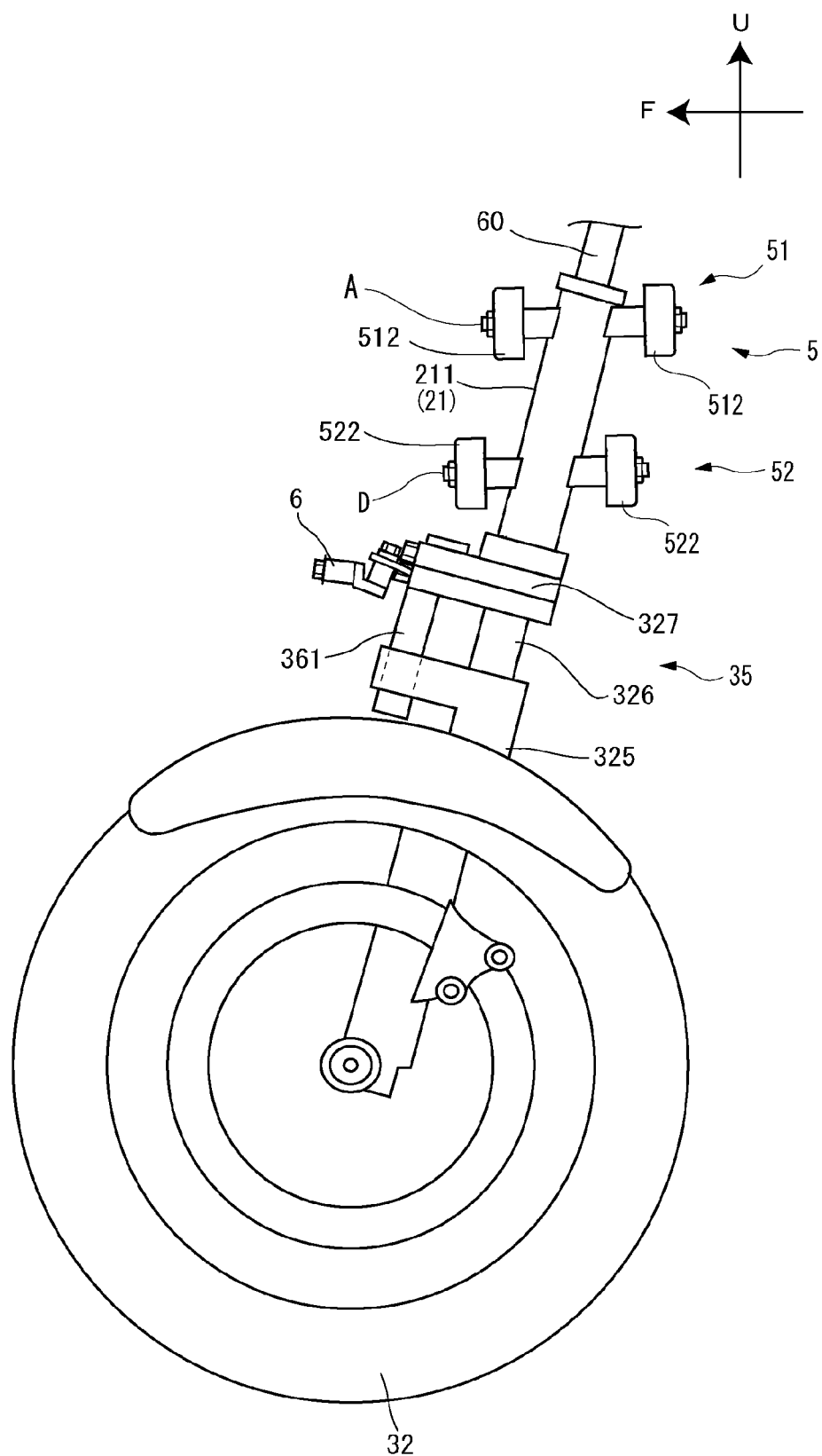
FIG. 4 is a left side view showing a portion of the three-wheeled vehicle in FIG. 1.

As shown in FIG. 4, the first cross member 51 includes a pair of plate-shaped members 512. The first cross member 51 extends in the left-and-right direction of the body frame 21. The pair of plate-shaped members 512 sandwiches the headpipe 211 therebetween in the front-and-rear direction of the body frame 21. In this description, the "front-and-rear direction of the body frame 21" denotes a direction which coincides with a front-and-rear direction of the vehicle 1. In this description, when an element is described as "extending in the left-and-right direction of the body frame 21," this includes a direction in which the element extends while being inclined in the left-and-right direction of the body frame 21 and in which the element extends substantially in the left-and-right direction of the body frame 21 rather than in the up-and-down direction and front-and-rear direction of the body frame 21.

As shown in FIG. 2, a middle portion of the first cross member 51 is supported on the body frame 21 (the headpipe 211) by a support portion A. The middle portion of the first cross member 51 is supported on the body frame 21 at the support portion A so as to turn about an upper middle axis AA that extends in the front-and-rear direction of the body frame 21. Even though the steering shaft 60 turns as the handlebar 23 is turned, the first cross member 51 does not turn about a turning axis of the steering shaft 60. In this description, when an element is described as "extending in the front-and-rear direction of the body frame 21," this includes a direction in which the element extends while being inclined in the front-and-rear direction of the body frame 21 and in which the element extends substantially in the front-and-rear direction of the body frame 21 rather than in the up-and-down direction and left-and-right direction of the body frame 21.

As shown in FIG. 2, a right end portion of the first cross member 51 is connected to an upper portion of the first side member 53 by a connecting portion B. An upper portion of the first side member 53 is supported so as to turn about an upper right axis that extends in the front-and-rear direction of the body frame 21 at the connecting portion B by the right end portion of the first cross member 51. A left end portion of the first cross member 51 is connected to an upper portion of the second side member 54 by a connecting portion C. An upper portion of the second side member 54 is supported so as to turn about an upper left axis that extends in the front-and-rear direction of the body frame 21 at the connecting portion C by the left end portion of the first cross member 51. The upper middle axis AA, upper right axis, and upper left axis are parallel or substantially parallel to each other.

As shown in FIG. 4, the second cross member 52 includes a pair of plate-shaped members 522. The second cross member 52 extends in the left-and-right direction of the body frame 21. The pair of plate-shaped members 522 sandwiches the headpipe 211 therebetween in the front-and-rear direction of the body frame 21. In an upright state of the body frame 21, the second cross member 52 is disposed below the first cross member 51 and above the first shock absorbing device 33 and the second shock absorbing device 35.

A middle portion of the second cross member 52 is supported on the body frame 21 (the headpipe 211) by a support portion D. The middle portion of the second cross member 52 is supported on the body frame 21 at the support portion D so as to turn about a lower middle axis that extends in the front-and-rear direction of the body frame 21. A turning axis that extends in the front-and-rear direction of the body frame 21 at the support portion D is parallel or substantially parallel to a turning axis that extends in the front-and-rear direction of the body frame 21 at the support portion A. Even though the steering shaft 60 turns as the handlebar 23 is turned, the second cross member 52 does not turn about the turning axis of the steering shaft 60.

As shown in FIG. 2, a right end portion of the second cross member 52 is connected to a lower portion of the first side member 53 by a connecting portion E. The lower portion of the first side member 53 is supported so as to turn about a lower right axis that extends in the front-and-rear direction of the body frame 21 at the connecting portion E by the right end portion of the second cross member 52. A left end portion of the second cross member 52 is connected to a lower portion of the second side member 54 at a connecting portion F. The lower portion of the second side member 54 is supported so as to turn about a lower left axis that extends in the front-and-rear direction of the body frame 21 at the connecting portion F by the left end portion of the second cross member 52.

The upper middle axis AA, upper right axis, upper left axis, lower middle axis, lower right axis, and lower left axis are parallel or substantially parallel to each other.

In this description, the first cross member 51 and the second cross member 52 preferably each include the pair of front and rear plate-shaped members that extend in the left-and-right direction. However, the first cross member 51 and the second cross member 52 may each include a member that extends rightward from the headpipe 211 and a member that extends leftward from the headpipe 211.

The first side member 53 is disposed directly to the right of the headpipe 211. The first side member 53 extends parallel or substantially parallel to a direction in which the headpipe 211 and the steering shaft 60 extend. The first side member 53 is disposed directly above the first front wheel 31 and the first shock absorbing device 33. The first side member 53 supports an upper portion of the first shock absorbing device 33 so as to turn about a first center axis X (an example of a right axis).

The second side member 54 is disposed directly to the left of the headpipe 211. The second side member 54 extends parallel or substantially parallel to the direction in which the headpipe 211 and the steering shaft 60 extend. The second side member 54 is disposed directly above the second front wheel 32 and the second shock absorbing device 35. The second side member 54 supports an upper portion of the second shock absorbing device 35 so as to turn about a second center axis Y (an example of a left axis).

The steering shaft 60 is supported on the body frame 21 between the first side member 53 and the second side member 54 in the left-and-right direction of the body frame 21. An upper end portion of the steering shaft 60 is located above the turning axis at the support portion D of the second cross member 52 in the up-and-down direction of the body frame 21. The steering shaft 60 turns about a middle steering axis Z that extends in the up-and-down direction of the body frame 21 (the headpipe 211). In this description, when an element is described as "extending in the up-and-down direction of the body frame 21," this includes a direction in which the element extends while being inclined in the up-and-down direction of the body frame 21 and in which the element extends substantially in the up-and-down direction of the body frame 21 rather than in the front-and-rear direction and left-and-right direction of the body frame 21.

Figure 5:
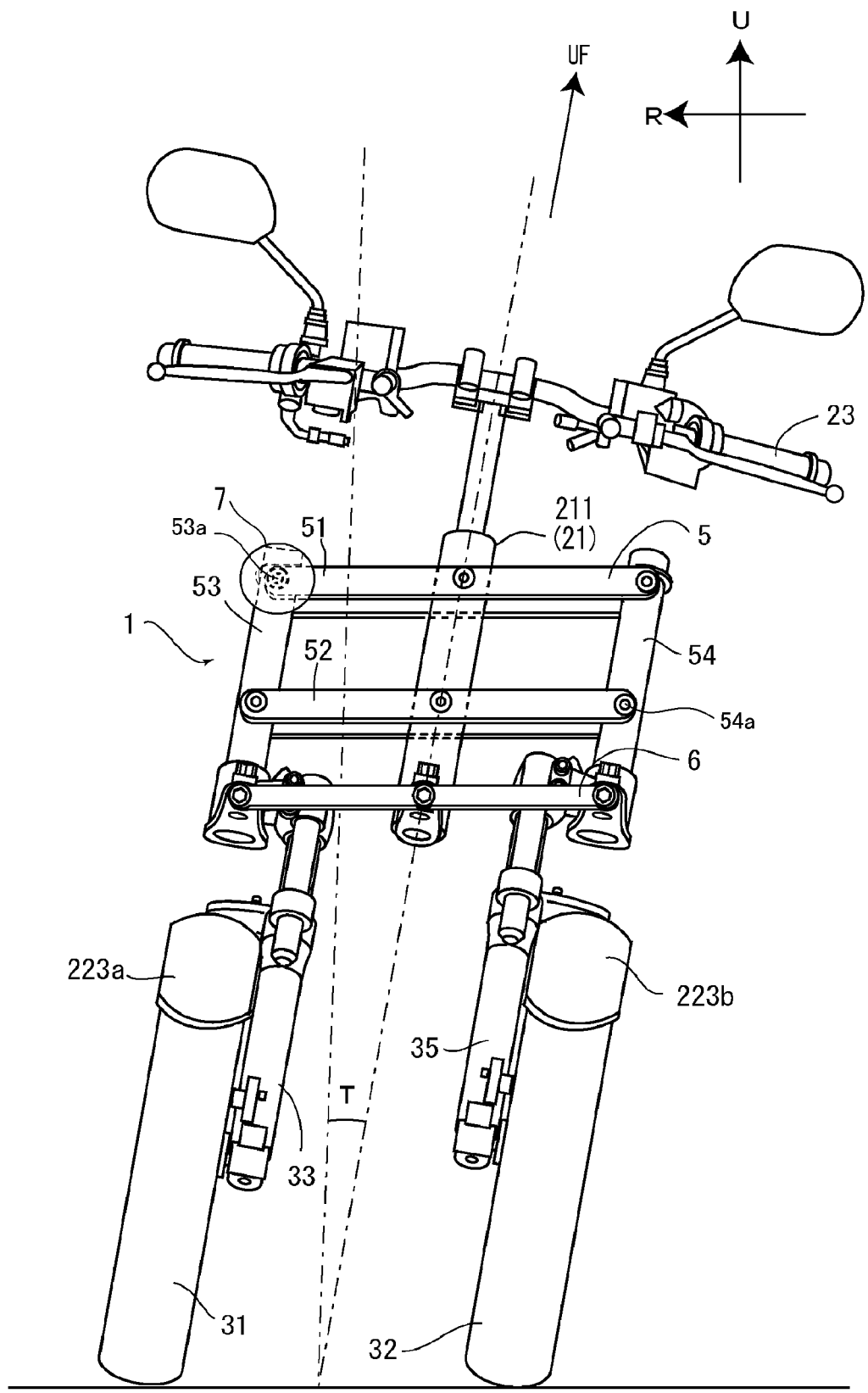
FIG. 5 is a front view of the three-wheeled vehicle shown in FIG. 1 showing the vehicle leaning.

FIG. 5 is a front view showing a state in which the body frame 21 leans leftward by an angle T. An upward direction of the body frame 21 is indicated by an arrow UF. In the upright state of the vehicle 1, the upward direction UF of the body frame 21 coincides with a vertically upward direction U. In the leaning state of the vehicle 1, the upward direction UF of the body frame 21 does not coincide with the vertically upward direction U.

When the body frame 21 leans leftward or rightward, the link mechanism 5 is deformed. When the rider attempts to cause the vehicle 1 to lean leftward by the angle T, the body frame 21 (the headpipe 211) leans leftward from the upright state thereof. As the body frame 21 leans so, the first cross member 51 and the second cross member 52 turn in relation to the headpipe 211, the first side member 53, and the second side member 54. As this occurs, the direction in which the first cross member 51 extends and the direction in which the second cross member 52 extends are parallel or substantially parallel when the vehicle 1 is seen from the front. As the headpipe 211 leans leftward, the left end portion of the first cross member 51 moves farther leftwards than the left end portion of the second cross member 52. This causes the second side member 54 to lean leftward from the upright state. As this occurs, the direction in which the second side member 54 extends is parallel or substantially parallel to the direction in which the headpipe 211 extends when the vehicle is seen from the front thereof. As with the second side member 54, the first side member 53 also leans leftward from the upright state. The direction in which the first side member 53 extends is parallel or substantially parallel to the direction in which the headpipe 211 extends when the vehicle 1 is seen from the front thereof. As the link mechanism 5 is deformed as described above, the second front wheel 32 is displaced farther upwards (in the upward direction UF) of the body frame 21 than the first front wheel 31, such that the vehicle 1 is permitted to lean leftward.

Similarly, when the rider attempts to cause the vehicle 1 to lean rightward, the body frame 21 (the headpipe 211) leans rightward from the upright state. As the body frame 21 leans so, the first cross member 51 and the second cross member 52 turn in relation to the headpipe 211, the first side member 53, and the second side member 54. As this occurs, the direction in which the first cross member 51 extends and the direction in which the second cross member 52 extends are parallel or substantially parallel when the vehicle 1 is seen from the front. As the headpipe 211 leans rightward, the left end portion of the first cross member 51 moves farther rightwards than the left end portion of the second cross member 52. This causes the second side member 54 to lean rightward from the upright state. As this occurs, the direction in which the second side member 54 extends is parallel or substantially parallel to the direction in which the headpipe 211 extends when the vehicle is seen from the front thereof. As the second side member 54 does, the first side member 53 also leans rightward from the upright state. The direction in which the first side member 53 extends is parallel or substantially parallel to the direction in which the headpipe 211 extends when the vehicle 1 is seen from the front thereof. As the link mechanism 5 is deformed as described above, the first front wheel 31 is displaced farther upwards of the body frame 21 than the second front wheel 32, such that the vehicle 1 is permitted to lean rightward.

The operation force transfer mechanism 6, which is an example of a turn transfer mechanism, is configured to transfer a turning motion of the steering shaft 60 according to an operation of the handlebar 23 to the first shock absorbing device 33 and the second shock absorbing device 35 so as to turn the first shock absorbing device 33 and the second shock absorbing device 35 about the first center axis X and the second center axis Y, respectively. A portion of the operation force transfer mechanism 6 is disposed directly below the second cross member 52. The operation force transfer mechanism 6 is disposed above the first front wheel 31 and the second front wheel 32.

As shown in FIG. 2, a lower end portion of the first side member 53 is connected to the first bracket 335. The first bracket 335 is attached to the first side member 53 so as to turn about the first center axis X. The operation force transfer mechanism 6 connects the lower end portion of the steering shaft 60 and the first bracket 335 together. The operation force transfer mechanism 6 transfers a turning motion of the steering shaft 60 which is triggered by a turning motion of the handlebar 23 to the first bracket 335. This causes the first bracket 335 to turn about the first center axis X in relation of the first side member 53. The first side member 53 does not turn in relation to the body frame 21 even though the handlebar 23 is turned.

A lower end portion of the second side member 54 is connected to the second bracket 327. The second bracket 327 is attached to the second side member 54 so as to turn about the second center axis Y in relation to the second side member 54. The operation force transfer mechanism 6 connects the lower end portion of the steering shaft 60 and the second bracket 327. The operation force transfer mechanism 6 transfers a turning motion of the steering shaft 60 which is triggered by a turning motion of the handlebar 23 to the second bracket 327. This causes the second bracket 327 to turn about the second center axis Y in relation to the second side member 54. The second side member 54 does not turn in relation to the body frame 21 even though the handlebar 23 is turned.

Figure 6:
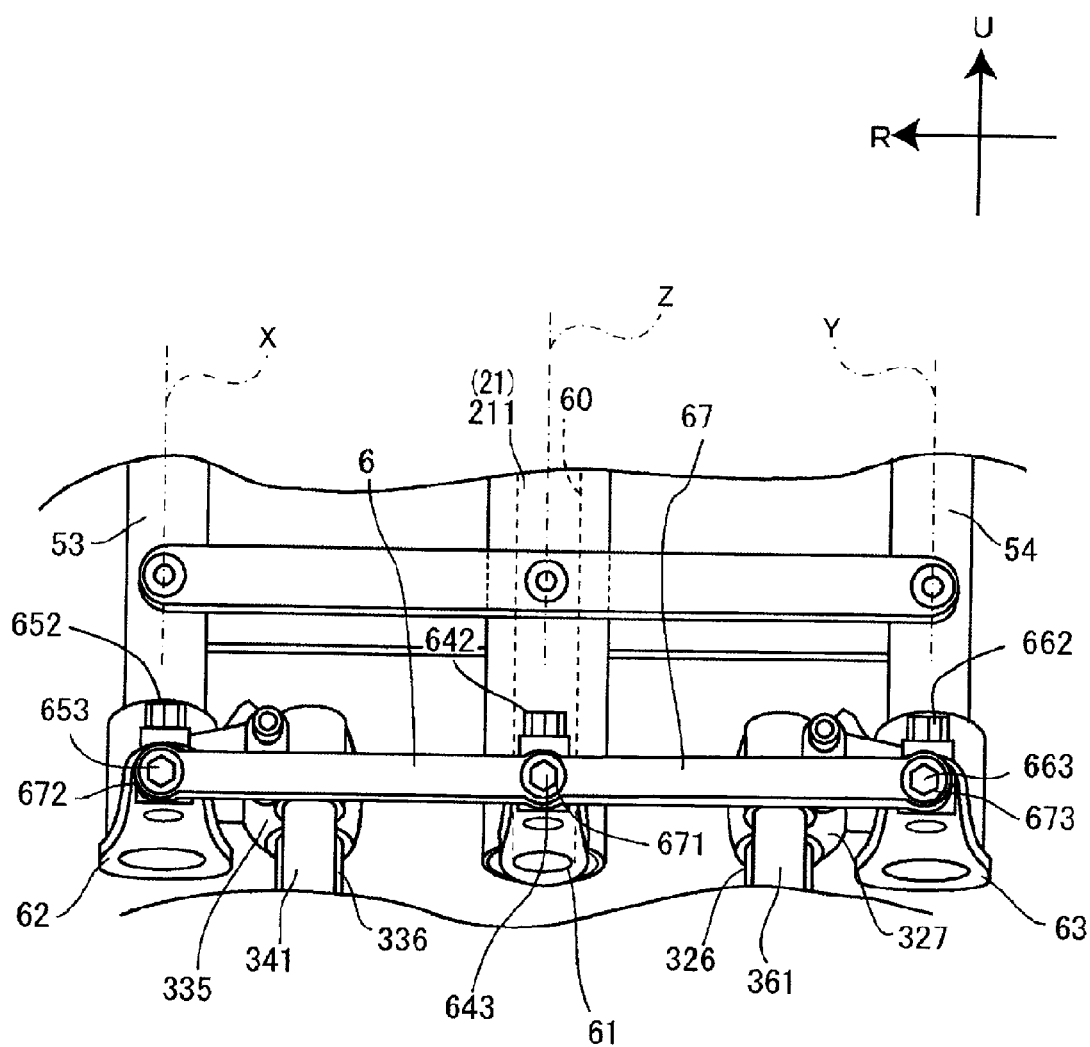
FIG. 6 is an enlarged front view showing an operation force transfer mechanism of the three-wheeled vehicle in FIG. 1.

FIG. 6 is a front view showing the operation force transfer mechanism 6 in an enlarged manner. The operation force transfer mechanism 6 includes the steering shaft 60, a first transfer plate 61, a second transfer plate 62, a third transfer plate 63, a first transfer member 67, the first bracket 335, and the second bracket 327.

The first transfer plate 61 is connected to the lower end portion of the steering shaft 60. The first transfer plate 61 cannot turn in relation to the steering shaft 60. When the handlebar 23 is turned in relation to the headpipe 211, the steering shaft 60 turns in relation to the headpipe 211. The first transfer plate 61 turns as the steering shaft 60 turns.

The second transfer plate 62 is fixed to the first bracket 335 of the first shock absorbing device 33 and is allowed to turn together with the first bracket 335 in relation to the first side member 53. The second transfer plate 62 is located below the first bracket 335.

The third transfer plate 63 is disposed symmetrical with the second transfer plate 62 with respect to the first transfer plate 61. The third transfer plate 63 is fixed to the second bracket 327 of the second shock absorbing device 35 and is configured to turn together with the second bracket 327 in relation to the second side member 54. The third transfer plate 63 is located below the second bracket 327.

In this description, a portion which is fixed to the first shock absorbing device 33 and which turns together with the first shock absorbing device 33 defines a portion of the first shock absorbing device 33. Consequently, the second transfer plate 62 of the operation force transfer mechanism 6 also defines a portion of the first shock absorbing device 33. Similarly, a portion which is fixed to the second shock absorbing device 35 and which turns together with the second shock absorbing device 35 defines a portion of the second shock absorbing device 35. Consequently, the third transfer plate 63 of the operation force transfer mechanism 6 also defines a portion of the second shock absorbing device 35.

The first transfer member 67 transfers an operation force that is transferred from the steering shaft 60 to the first bracket 335 and the second bracket 327. The first transfer member 67 extends in the left-and-right direction of the body frame 21. A configuration to enable the operation force to be transferred from the steering shaft 60 to the first bracket 335 and the second bracket 327 will be described in detail below.

Figure 7:
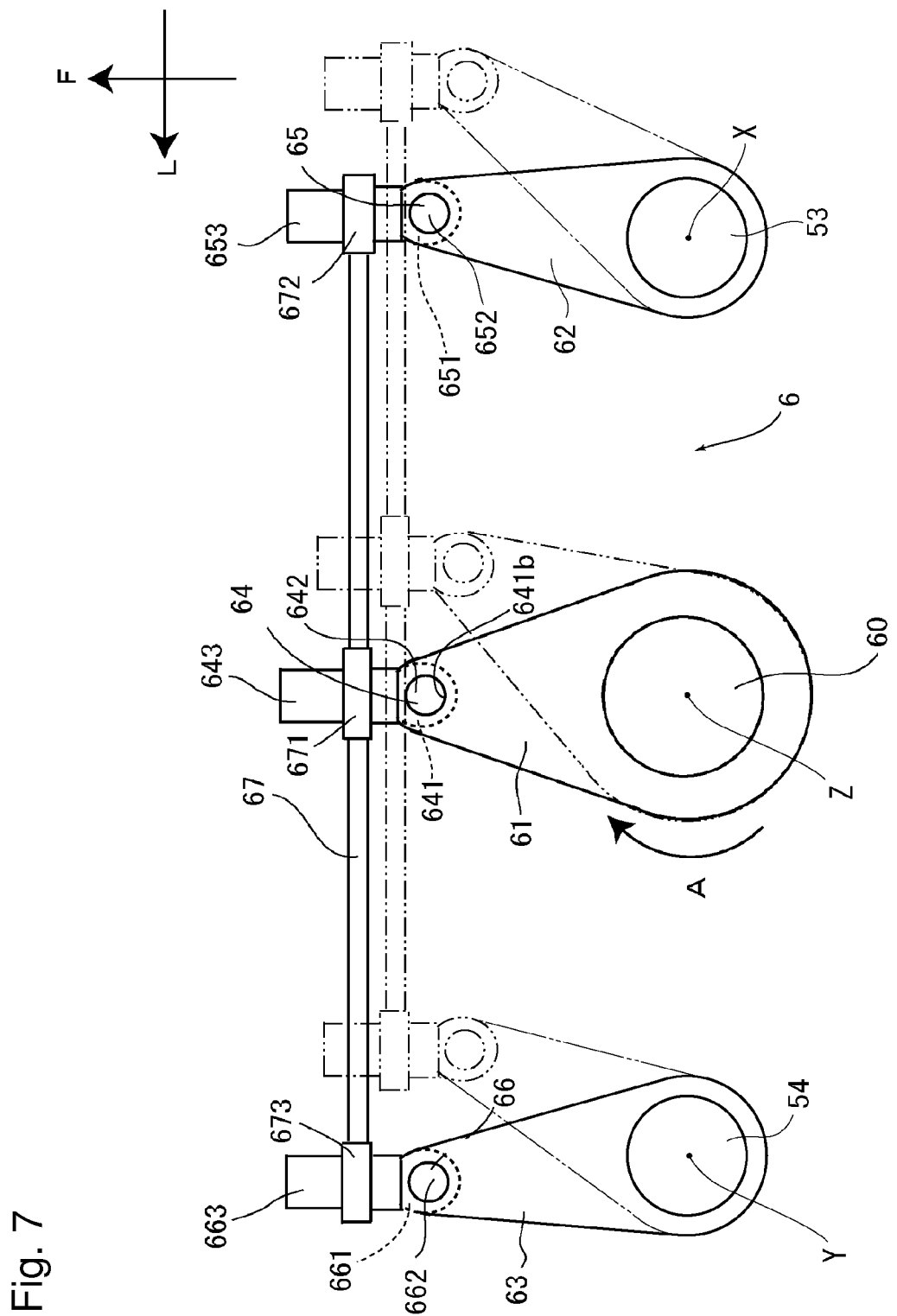
FIG. 7 is a drawing showing schematically the operation of the operation force transfer mechanism in FIG. 6.

FIG. 7 is a schematic plan view showing the configuration of the operation force transfer mechanism 6. In FIG. 7, the operation force transfer mechanism 6 is viewed from above with the configurations of the link mechanism 5, the brackets and the like all omitted. Two-dot chain lines in FIG. 7 indicate a state in which the steering shaft 60 is turned in a direction indicated by an arrow A.

The operation force transfer mechanism 6 includes a first joint 64, a second joint 65, and a third joint 66.

The first transfer plate 61 is narrower in width at a front portion than at a rear portion of the first transfer plate 61. The first joint 64 is disposed at the front portion of the first transfer plate 61.

The second transfer plate 62 is narrower in width at a front portion than at a rear portion of the second transfer plate 62. The second joint 65 is disposed directly in front of the second transfer plate 62. The second transfer plate 62 is disposed directly to the right of the first transfer plate 61.

The third transfer plate 63 is narrower in width at a front portion than at a rear portion of the third transfer plate 63. The third joint 66 is disposed directly in front of the third transfer plate 63. The third transfer plate 63 is disposed directly to the left of the first transfer plate 61.

The first joint 64 includes a first bearing 641, a first shaft 642, and a first front rod 643. The first shaft 642 turns relative to the first bearing 641. The first bearing 641 supports the first shaft 642. The first bearing 641 is supported on the first transfer plate 61. The first transfer plate 61 includes a first support hole 641b that supports the first shaft 642. The first shaft 642 is fitted in the first support hole 641b. The first bearing 641 is fixed to the first shaft 642. The first shaft 642 is disposed at a front end of the first transfer plate 61.

The first front rod 643 extends forward from the first bearing 641. The first front rod 643 turns relatively leftward or rightward about the first shaft 642 as a result of the first bearing 641 turning in relation to the first transfer plate 61. The first front rod 643 is fixed to the first bearing 641.

The second joint 65 includes a second bearing 651, a second shaft 652, and a second front rod 653. The second bearing 651 preferably has a configuration similar to that of the first bearing 641. The second shaft 652 preferably has a configuration similar to that of the first shaft 642. The second front rod 653 preferably has a configuration similar to that of the first front rod 643.

The third joint 66 includes a third bearing 661, a third shaft 662, and a third front rod 663. The third bearing 661 preferably has a configuration similar to that of the first bearing 641. The third shaft 662 preferably has a configuration similar to that of the first shaft 642. The third front rod 663 preferably has a configuration similar to that of the first front rod 643.

The first transfer member 67 includes a first ring 671, a second ring 672, and a third ring 673. The first front rod 643 is inserted through the first ring 671. The first ring 671 is provided at a center in a left-and-right direction of the first transfer member 67. The second ring 672 is disposed directly to the right of the first ring 671. The second front rod 653 is inserted into the second ring 672. The third ring 673 is disposed directly to the left of the first ring 671. The third front rod 663 is inserted into the third ring 673.

Figure 8:
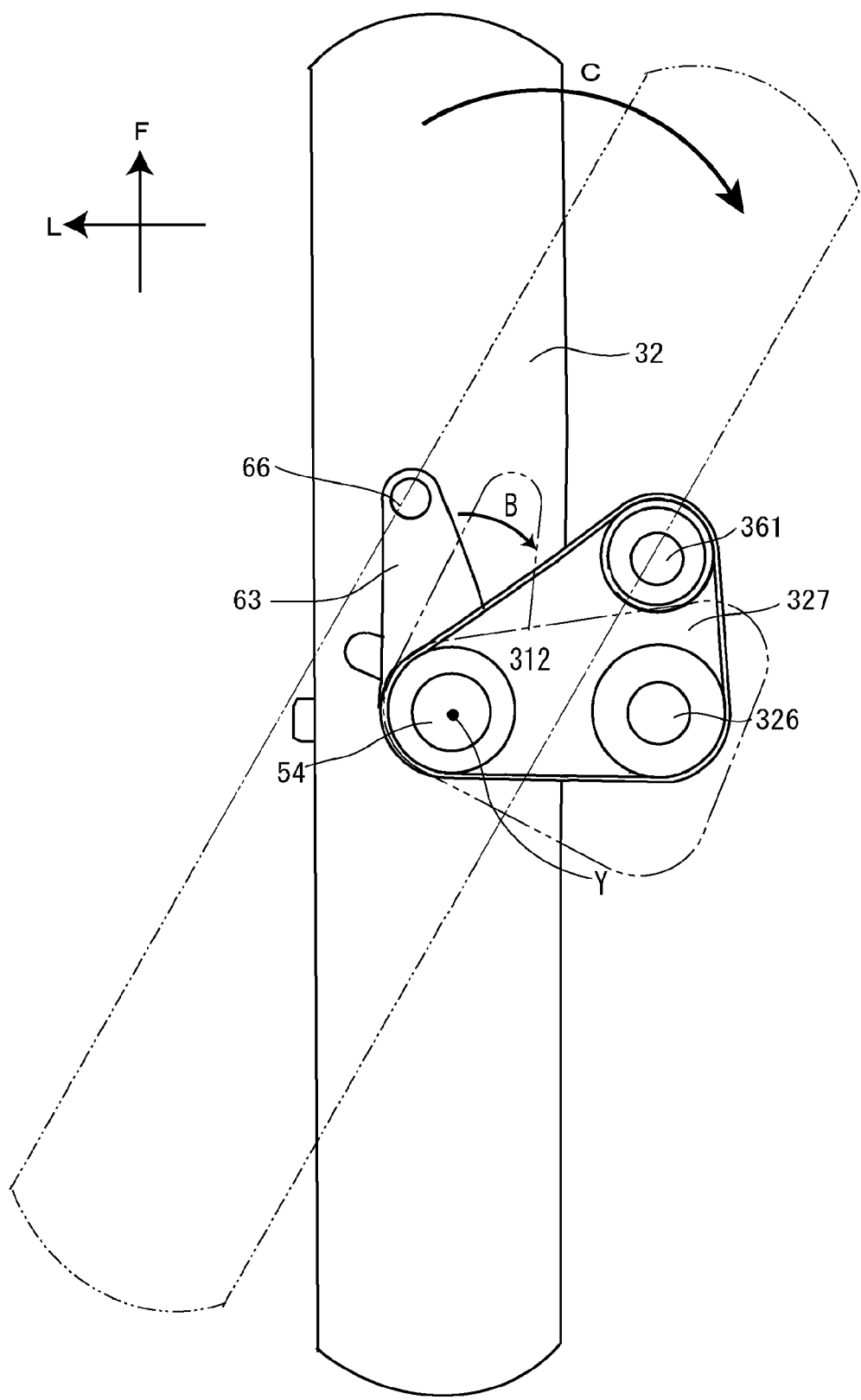
FIG. 8 is a drawing showing schematically the operation of a second bracket and a second front wheel of the three-wheeled vehicle in FIG. 1.

FIG. 8 is a plan view showing the second front wheel 32 and the second bracket 327. Two-dot chain lines in FIG. 8 indicate a state in which the second front wheel 32 is turned. The second front fender 223b is omitted from the illustration.

The second bracket 327 is connected to the second side member 54 as described above. The third transfer plate 63 is mounted on the second bracket 327.

When the steering shaft 60 is turned, the first transfer plate 61 turns as the steering shaft 60 turns. Here, for example, when the steering shaft 60 is turned in a direction indicated by an arrow A in FIG. 7, the first joint 64 moves rightward and rearward as the first transfer plate 61 turns. As this occurs, the first shaft 642 rotates in relation to the first bearing 641 to move the first transfer member 67 rightward and rearward while maintaining the posture of the first transfer member 67. The second front rod 653 and the third front rod 663 move rightward and rearward as the first transfer member 67 moves rightward. When the second front rod 653 and the third front rod 663 move rightward and rearward, the second bearing 651 and the third bearing 661 move rightward and rearward. As the second bearing 651 and the third bearing 661 move rightward and rearward, the second transfer plate 62 and the third transfer plate 63 turn in the direction indicated by the arrow A about the first side member 53 and the second side member 54, respectively. This creates the state indicated by the two-dot chain lines in FIG. 7. A turning center of the second transfer plate 62 coincides with the first center axis X. A turning center of the third transfer plate 63 coincides with the second center axis Y.

When the third transfer plate 63 turns about the third side member 54, the second bracket 327 turns in a direction indicated by an arrow B in FIG. 8 via a third transfer member 69. When the second bracket 327 turns in the direction indicated by the arrow B, the second front wheel 32 turns in a direction indicated by an arrow C in FIG. 8 via the second shock absorber 350. The front wheel 32 turns rightward about the second center axis Y. As this occurs, the front wheel 32 takes a position indicated by two-dot chain lines in FIG. 8. As the second front wheel 32 does, the first front wheel 31 turns rightward about the first center axis X. In this manner, the first front wheel 31 and the second front wheel 32 turn in the left-and-right direction of the body frame 21 by turning the handlebar 23 in the left-and-right direction of the body frame 21.

Subsequently, the resisting force change mechanism 7 will be described with reference to FIGS. 9B to 11. The resisting force change mechanism 7 suppresses a deformation of the link mechanism 5. Specifically, the resisting force change mechanism 7 is configured to change a resisting force being exerted against a relative turning between the first cross member 51 and the second cross member 52 with respect to the body frame 21. The resisting force change mechanism 7 changes the resisting force, which occurs when the upper cross member 51 and the lower cross member 52 are displaced from their respective positions relative to the body frame 21, in at least two different magnitudes.

Figure 9A:
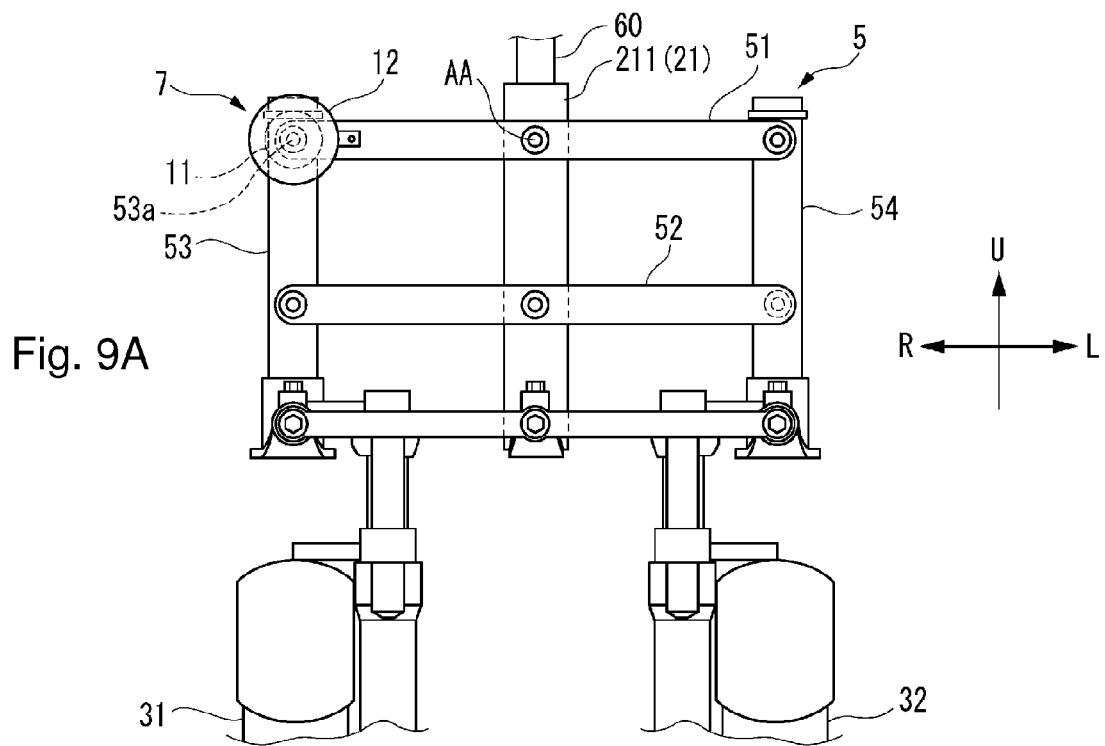
FIGS. 9A and 9B are drawings showing a resisting force change mechanism of the three-wheeled vehicle in FIG. 1.
Figure 9B:
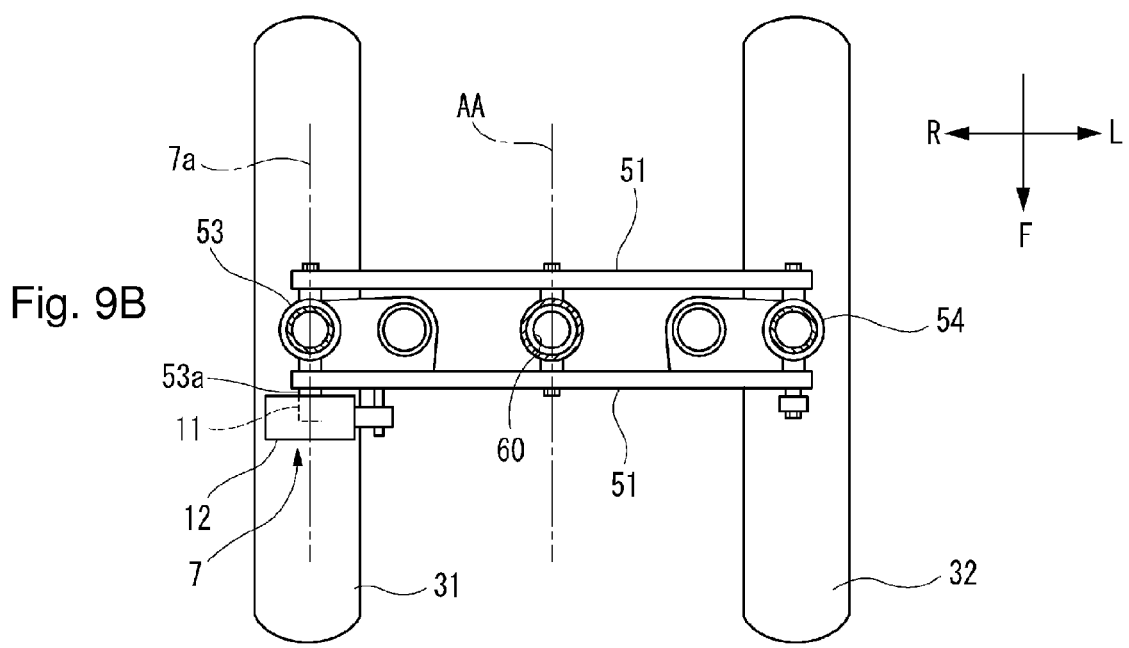

FIGS. 9A and 9B are views illustrating the resisting force change mechanism 7. The vehicle body cover 22 and the like are not illustrated in FIGS. 9A and 9B. FIG. 9A is a front view illustrating a portion of the vehicle 1 equipped with the resisting force change mechanism 7. FIG. 9A is a view of a portion of the vehicle 1 when seen from the front in a direction of the upper middle axis AA. FIG. 9B is a view when the body frame 21 illustrated in FIG. 9A is seen from above.

The resisting force change mechanism 7 of the present preferred embodiment is preferably a drum brake, for example. For example, the drum brake disclosed in Japanese Patent Unexamined Publication JP-A-2000-329168 and the like.

As illustrated in FIGS. 9A and 9B, the resisting force change mechanism 7 includes an inner element 11 and a cylindrical drum 12. The inner element 11 is disposed inside of the cylindrical drum 12. The inner element 11 turns relative to the drum 12 about a resisting force change axis 7a which is parallel or substantially parallel with the upper middle axis AA. In the present preferred embodiment, the resisting force change axis 7a coincides with the upper right axis. The inner element 11 is fixed to the right side member 53. The drum 12 is fixed to the upper cross member 51. The drum 12 has an inner circumferential surface 12a that extends parallel or substantially parallel with the resisting force change mechanism 7 (refer to FIGS. 10A and 10B). The inner circumferential surface 12a of the drum 12 preferably has a circular or substantially circular shape when seen in the direction of the upper middle axis AA.

Figure 10A:
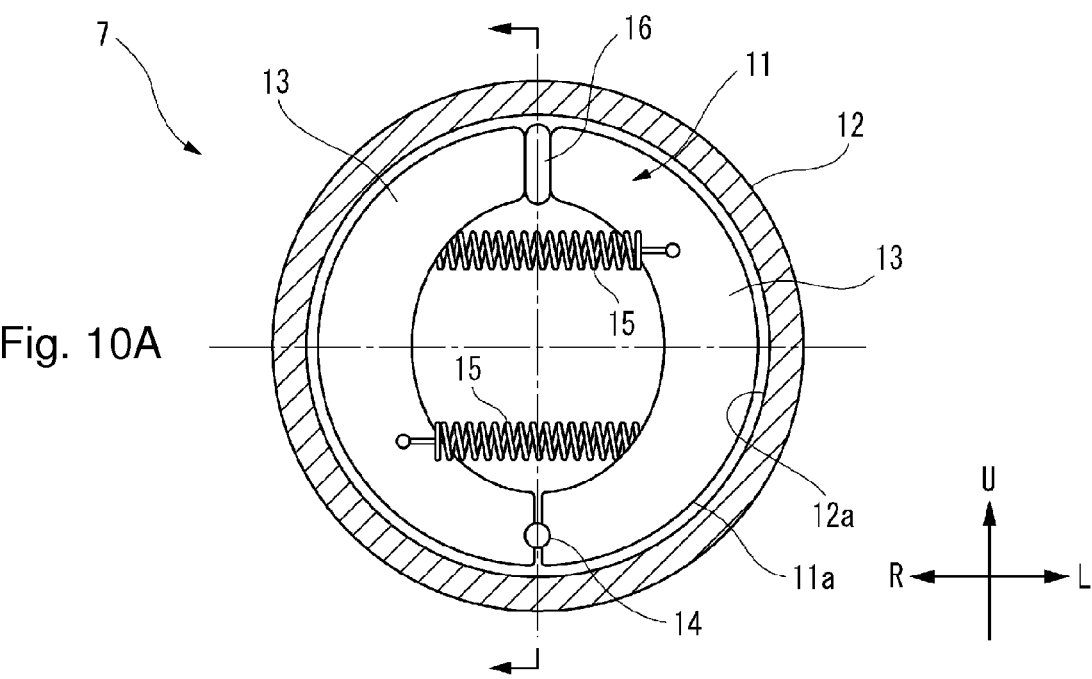
FIGS. 10A and 10B are schematic views of an internal structure of the resisting force change mechanism illustrated in FIGS. 9A and 9B when seen from the front in a direction of an upper middle axis.
Figure 10B:
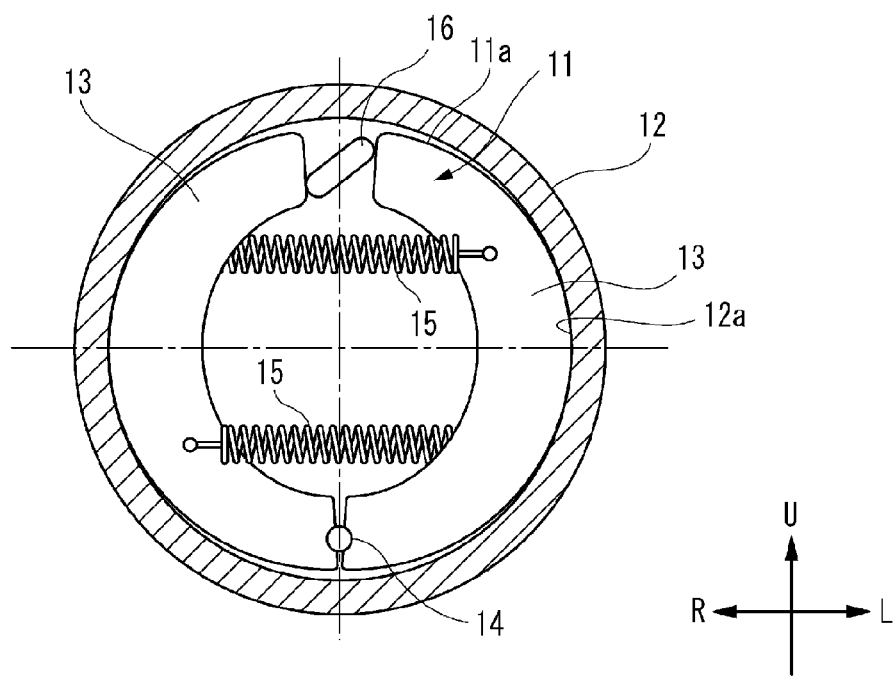
Figure 11:
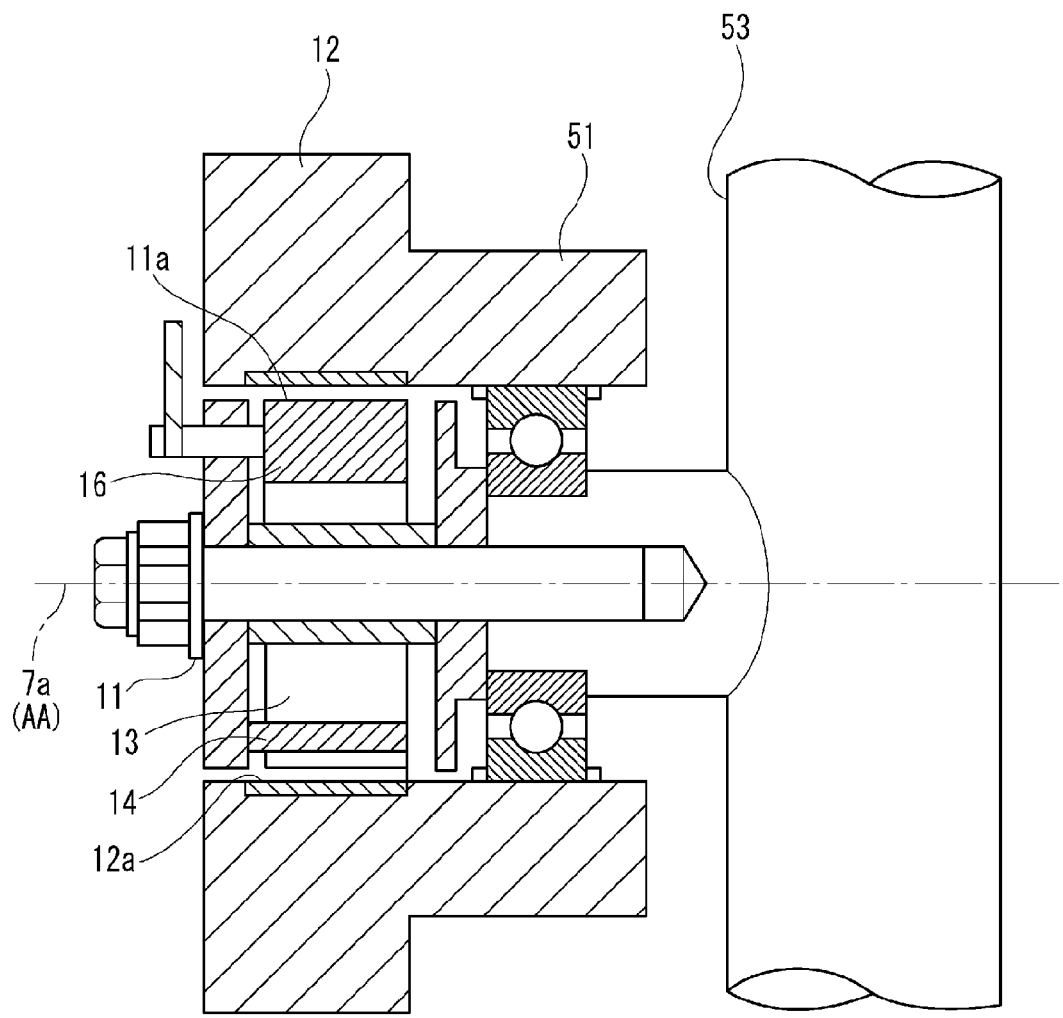
FIG. 11 is a vertical cross-sectional view of the resisting force change mechanism illustrated in FIGS. 9A and 9B.
Figure 11:
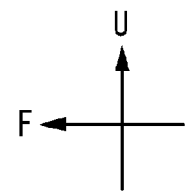

FIGS. 10A and 10B are schematic views of an internal structure of the resisting force change mechanism 7 when seen from the front in the direction of the upper middle axis AA. FIG. 11 is a vertical cross-sectional view of the resisting force change mechanism 7. As illustrated in FIGS. 10A, 10B, and 11, the inner element 11 includes a pair of brake shoes 13. The brake shoe 13 preferably has a semicircular or substantially semicircular shape when seen in the direction of the upper middle axis AA. The brake shoe 13 has an outer circumferential surface 11a that extends parallel or substantially parallel to the resisting force change axis 7a. The outer circumferential surface 11a of the brake shoe 13 has approximately the same curvature as that of the inner circumferential surface 12a of the drum 12.

A connection shaft 14 is provided between respective lower portions of the pair of brake shoes 13. The respective lower portions of the pair of brake shoes 13 are turnably connected to the connection shaft 14. The connection shaft 14 extends parallel or substantially parallel to the upper middle axis AA. The pair of brake shoes 13 are turnably supported by the connection shaft 14. The connection shaft 14 is fixed to an upper right axial portion 53a of the right side member 53. The upper right axial portion 53a extends forward from the right side member 53 so as to be parallel or substantially parallel with the upper right axis. The upper right axial portion 53a passes through the upper cross member 51, and protrudes forward of the upper cross member 51.

Springs 15 are respectively connected to the pair of brake shoes 13. The springs 15 always exert a force on the brake shoe 13, and the force is exerted in a direction in which the outer circumferential surface 11a of the brake shoe 13 separates from the inner circumferential surface 12a of the drum.

A cam 16 is provided between respective upper portions of the pair of brake shoes 13. The cam 16 has an elliptical or substantially elliptical shape when seen in the direction of the upper middle axis AA. The cam 16 turns about a cam axis parallel or substantially parallel with the upper middle axis AA. A driver turns the cam 16 by operating an operation unit provided on the handlebar 23. For example, the operation unit preferably is a switch, a button, a lever, or the like.

When the cam 16 turns about the cam axis, the cam 16 widens a gap between the respective upper portions of the pair of brake shoes 13. The outer circumferential surface 11a of the brake shoe 13 comes into contact with the inner circumferential surface 12a of the drum 12, and a frictional force occurs between the outer circumferential surface 11a of the brake shoe 13 and the inner circumferential surface 12a of the drum 12. Accordingly, the resisting force change mechanism 7 changes the resisting force against a relative displacement between the inner element 11 and the drum 12.

When the body frame 21 leans, the upper cross member 51 and the lower cross member 52 turn with respect to the body frame 21. Accordingly, the right side member 53 turns with respect the upper cross member 51 about the upper right axis. The inner member 11 corresponds to a first portion of the resisting force change mechanism 7, and is fixed to the right side member 53 which is one member of the link mechanism 5. The drum 12 corresponds to a second portion of the resisting force change mechanism 7, and is fixed to the upper cross member 51 which is the other member of the link mechanism 5. For this reason, the drum 12 turns with respect to the inner element 11 about the resisting force change axis 7a in synchronization with the turning of the right side member 53 relative to the upper cross member 51.

The resisting force change mechanism 7 of the present preferred embodiment changes a resisting force exerted against a turning operation of each the upper cross member 51 and the lower cross member 52 with respect to the body frame 21. The resisting force change mechanism 7 changes a resisting force, which occurs when the upper cross member 51 and the lower cross member 52 are displaced from their respective positions relative to the body frame 21, in at least two different magnitudes.

Note that the resisting force which occurs when the upper cross member 51 and the lower cross member 52 are displaced from their respective positions relative to the body frame 21 is changed in at least two different magnitudes means that respective resisting forces on the upper cross member 51 and the lower cross member 52 with respect to the body frame 21 in an upright state are changed.

The resisting force change mechanism 7 includes the first portion (the inner element 11) and the second portion (the drum 12) that turn relative to each other about the resisting force change axis 7a which is parallel or substantially parallel with the upper middle axis AA, and that change a resisting force against the relative turning.

The inner element 11 is non-turnably fixed to one member (the right side member 53 in the present preferred embodiment) of the right side member 53, a left side member 54, the upper cross member 51, the lower cross member 52, and the body frame 21.

The drum 12 is supported by the other member (the upper cross member 51 in the present preferred embodiment) of the right side member 53, the left side member 54, the upper cross member 51, the lower cross member 52, and the body frame 21, at least a portion of which is turnably supported by one member. The drum 12 turns with respect to the inner element 11 about the resisting force change axis 7a in synchronization with the turning of one member (the upper cross member 51) relative to the other member (the upper cross member 51).

The drum 12 turns relative to the inner element 11 about the resisting force change axis 7a which is parallel or substantially parallel with the upper middle axis AA. The resisting force change mechanism 7 changes a resisting force which occurs when the inner element 11 and the drum 12 turn relative to each other about the resisting force change axis 7a which is parallel or substantially parallel with the upper middle axis AA. Since the inner element 11 and the drum 12 turn about the resisting force change axis 7a, the resisting force change mechanism 7 is unlikely to increase in size as seen in the direction of the upper middle axis AA.

Specifically, the inner element 11 is fixed to one member (the right side member 53) of the link mechanism 5. The other member (the upper cross member 51) of the link mechanism 5 supports the drum 12, and is turnably supported by one member (the right side member 53). Since the right side member 53 and the upper cross member 51 turn about the upper right axis, the right side member 53 and the upper cross member 51 are disposed close to each other when seen from the front in the direction of the upper middle axis AA. The inner element 11 is fixed to the right side member 53 and the drum 12 is fixed to the upper cross member 51. It is possible to dispose the inner element 11 and the drum 12 close to each other, and it is possible to make the resisting force change mechanism 7 compact when seen from the front in the direction of the upper middle axis AA.

The right side member 53 and the upper cross member 51 of the link mechanism 5 turn relative to each other about the upper right axis which is parallel or substantially parallel with the upper middle axis AA. The inner element 11 and the drum 12 of the resisting force change mechanism 7 turn relative to each other about the upper right axis which is parallel or substantially parallel with the upper middle axis AA. Since a movement direction of the members of the link mechanism 5 is parallel or substantially parallel with a movement direction of the members of the resisting force change mechanism 7, the resisting force change mechanism 7 is prevented from interfering with the link mechanism 5. For this reason, it is possible to prevent interference between the resisting force change mechanism 7 and the link mechanism 5, and it is possible to prevent an increase in the size of the vehicle 1 even when equipped with the resisting force change mechanism 7.

Furthermore, the inner element 11 is fixed to one member (the right side member 53) of the link mechanism 5. The drum 12 is supported by the other member (the upper cross member 51) of the link mechanism 5. The inner element 11 turns relative to the drum 12 in synchronization with the relative turning between one member and the other member of the link mechanism 5.

The link mechanism 5 includes the members such as the right side member 53 and the upper cross member 51 which turn relative to each other. Since the inner element 11 and the drum 12 of the resisting force change mechanism 7 are respectively provided on the members of the link mechanism 5, the inner element 11 and the drum 12 of the resisting force change mechanism turn relative to each other in synchronization with a turning operation of the link mechanism 5. Accordingly, the resisting force change mechanism 7 changes a resisting force against the relative turning between the inner element 11 and the drum 12 by using the turning operation of the link mechanism 5. For this reason, it is possible to simplify the structure of the resisting force change mechanism 7, and it is possible to make the resisting force change mechanism 7 compact.

For the above-described reasons, according to the present preferred embodiment, it is possible to configure the vehicle 1 with the compact resisting force change mechanism 7. Even when the vehicle 1 is equipped with the resisting force change mechanism 7, a structure around the circumference of the steering shaft 60 is prevented from increasing in size.

In the resisting force change mechanism 7 of the preferred embodiment, the resisting force change axis 7a coincides with the upper right axis which is a turning axis of the right side member 53 and the upper cross member 51. For this reason, it is possible to make the resisting force change mechanism 7 compact when seen from the front in the direction of the upper middle axis AA.

In the present preferred embodiment, the right side member 53 is provided with the upper right axial portion 53a by which the upper cross member 51 is supported so as to be turnable about the upper right axis which is parallel or substantially parallel with the upper middle axis AA. The inner element 11 is fixed to the upper right axial portion 53a. In the present preferred embodiment, the upper right axial portion 53a of the right side member 53 has a function of turnably supporting the upper cross member 51, and a function of supporting the inner element 11 of the resisting force change mechanism 7. For this reason, it is possible to make the link mechanism 5 and the resisting force change mechanism 7 compact.

The outer circumferential surface 11a of the brake shoe 13 of the inner element 11 extends in a direction of the resisting force change axis 7a. The inner circumferential surface 12a of the drum 12 faces the outer circumferential surface 11a of the brake shoe 13, and extends in the direction of the resisting force change axis 7a. The resisting force change mechanism 7 changes a frictional force (a resisting force against the relative turning between the inner element 11 and the drum 12) between the outer circumferential surface 11a of the brake shoe 13 and the inner circumferential surface 12a of the drum 12.

Since the outer circumferential surface 11a of the brake shoe 13 and the inner circumferential surface 12a of the drum 12 extend in the direction of the resisting force change axis 7a which is parallel or substantially parallel with the upper middle axis AA, it is possible to make the resisting force change mechanism 7 compact as seen in the direction of the upper middle axis AA. When both the outer circumferential surface 11a of the brake shoe 13 and the inner circumferential surface 12a of the drum 12 are long in the direction of the resisting force change axis 7a, it is possible to obtain a large resisting force against the relative turning between the inner element 11 and the drum 12. For this reason, the resisting force change mechanism 7 generates a large resisting force even when the size thereof as seen in the direction of the upper middle axis AA remains unchanged.

In the present preferred embodiment, each of the outer circumferential surface 11a of the brake shoe 13 and the inner circumferential surface 12a of the drum 12 preferably has an arc or substantially arc shape when seen in the direction of the upper middle axis AA. For this reason, the outer circumferential surface 11a of the drum 12 easily has an arc or substantially arc shape defining an external appearance of the deformation force suppressing mechanism 7, and it is possible to prevent the deformation force suppressing mechanism 7 from interfering with vehicle mounting components such as a lamp which is disposed around the circumference thereof.

In the present preferred embodiment, the resisting force change mechanism 7 is preferably a drum brake mechanism. For this reason, a self-servo action occurs in the resisting force change mechanism 7, and the turning of the upper cross member 51 and the lower cross member 52 relative to the body frame 21 is likely to stop.

For example, when the turning of the cam 16 causes the pair of brake shoes 13 to be pressed against the drum 12, and the body frame 21 leans to the right, the upper cross member 51 turns with respect to the right side member 53 in a clockwise direction when seen from the front in the direction of the upper middle axis AA, and the drum 12 turns with respect to the inner element 11 in the clockwise direction when seen from the front in the direction of the upper middle axis AA.

The inner circumferential surface 12a of the drum 12 exerts a force on the left brake shoe 13, and the force causes the brake shoe 13 to turn with the clockwise turning of the drum 12. Since the lower portion of the left brake shoe 13 is connected to the connection shaft 14, the upper portion of the left brake shoe 13 leans toward the inner circumferential surface 12a of the drum 12, and the right brake shoe 13 is more strongly pressed against the inner circumferential surface 12a of the drum 12. Accordingly, a frictional force between the right brake shoe 13 and the drum 12 increases. When the drum 12 turns with respect to the inner element 11 in a counterclockwise direction, a resisting force to stop the counterclockwise turning increases.

In contrast, when the body frame 21 leans to the left, the right brake shoe 13 is pressed against the inner circumferential surface 12a of the drum 12, a frictional force between the right brake shoe 13 and the drum 12 increases. When the drum 12 turns with respect to the inner element 11 in the counterclockwise direction, a resisting force to stop the counterclockwise turning becomes large.

For this reason, the degree of leaning of the body frame 21 is easily maintained by the resisting force change mechanism 7. Since the resisting force change mechanism 7 generates a large resisting force, it is easy to reduce the size of the resisting force change mechanism 7.

Second Preferred Embodiment

Subsequently, a second preferred embodiment and a third preferred embodiment of the present invention will be described. Since only the resisting force change mechanism in each of the second preferred embodiment and the third preferred embodiment is different from that in the first preferred embodiment, the resisting force change mechanism will be mainly described. Each element which is the same as or similar to that of the first preferred embodiment is not illustrated. The same reference numbers are assigned to the same or similar elements, and the description thereof is omitted.

Figure 12A:
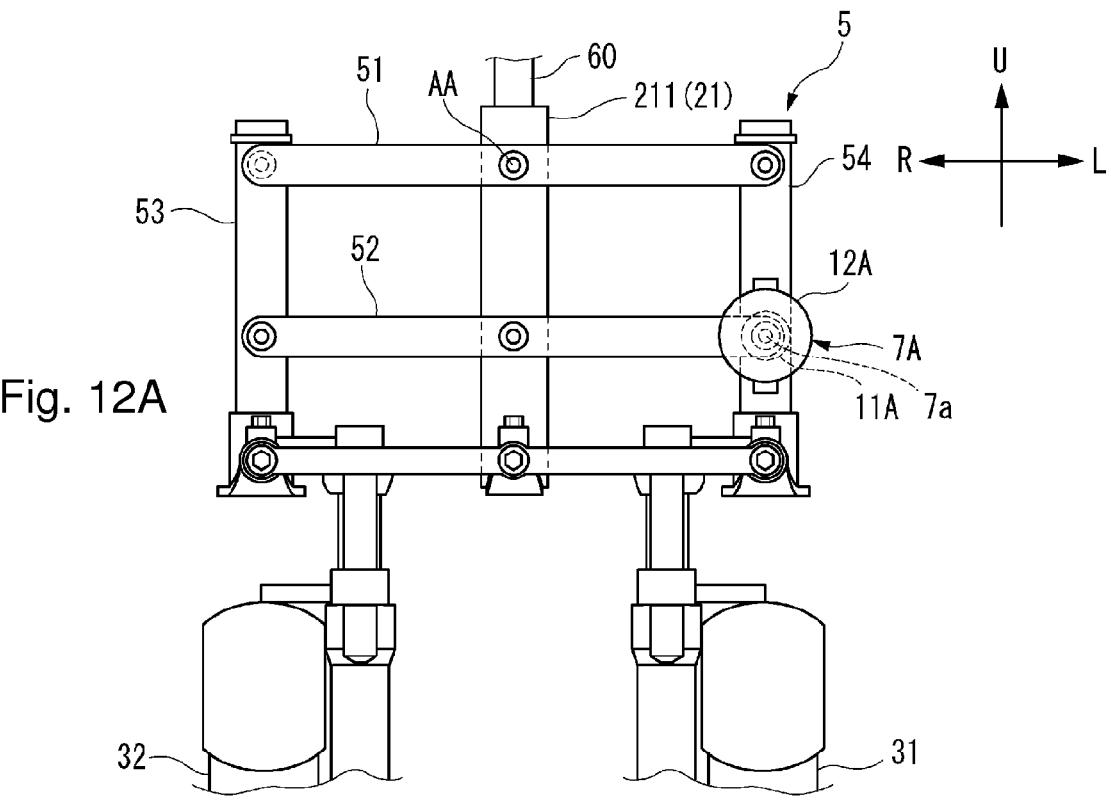
FIGS. 12A and 12B are views illustrating a resisting force change mechanism according to a second preferred embodiment of the present invention and corresponding to FIGS. 9A and 9B.
Figure 12B:
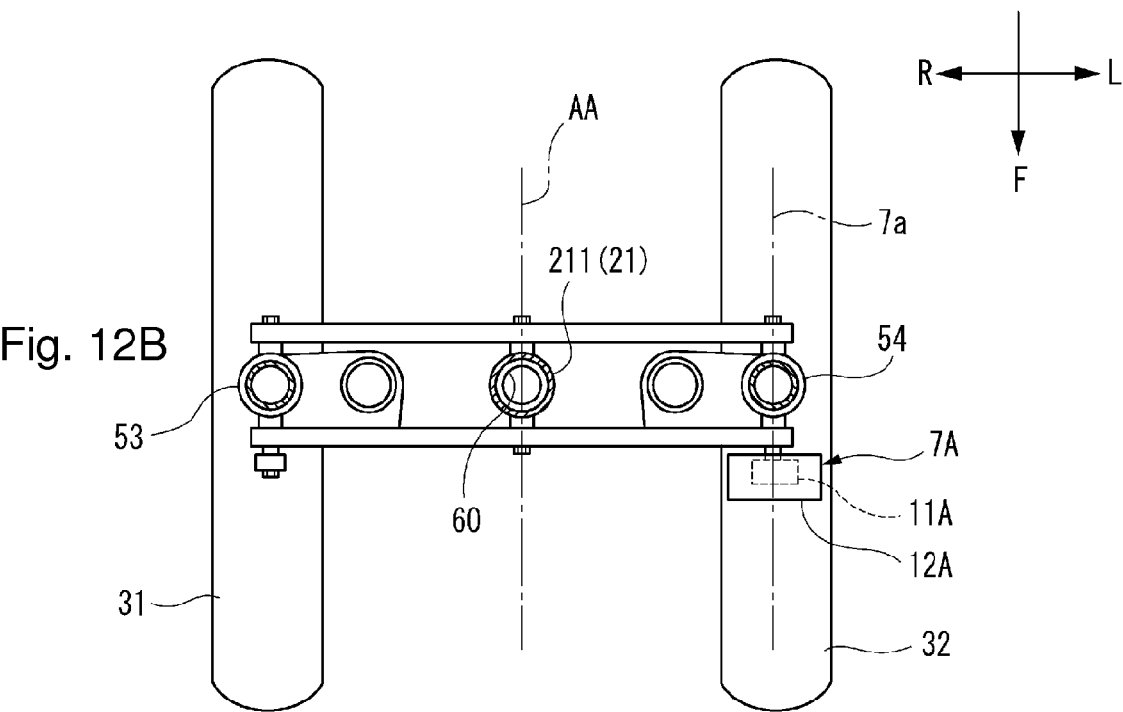
Figure 13:
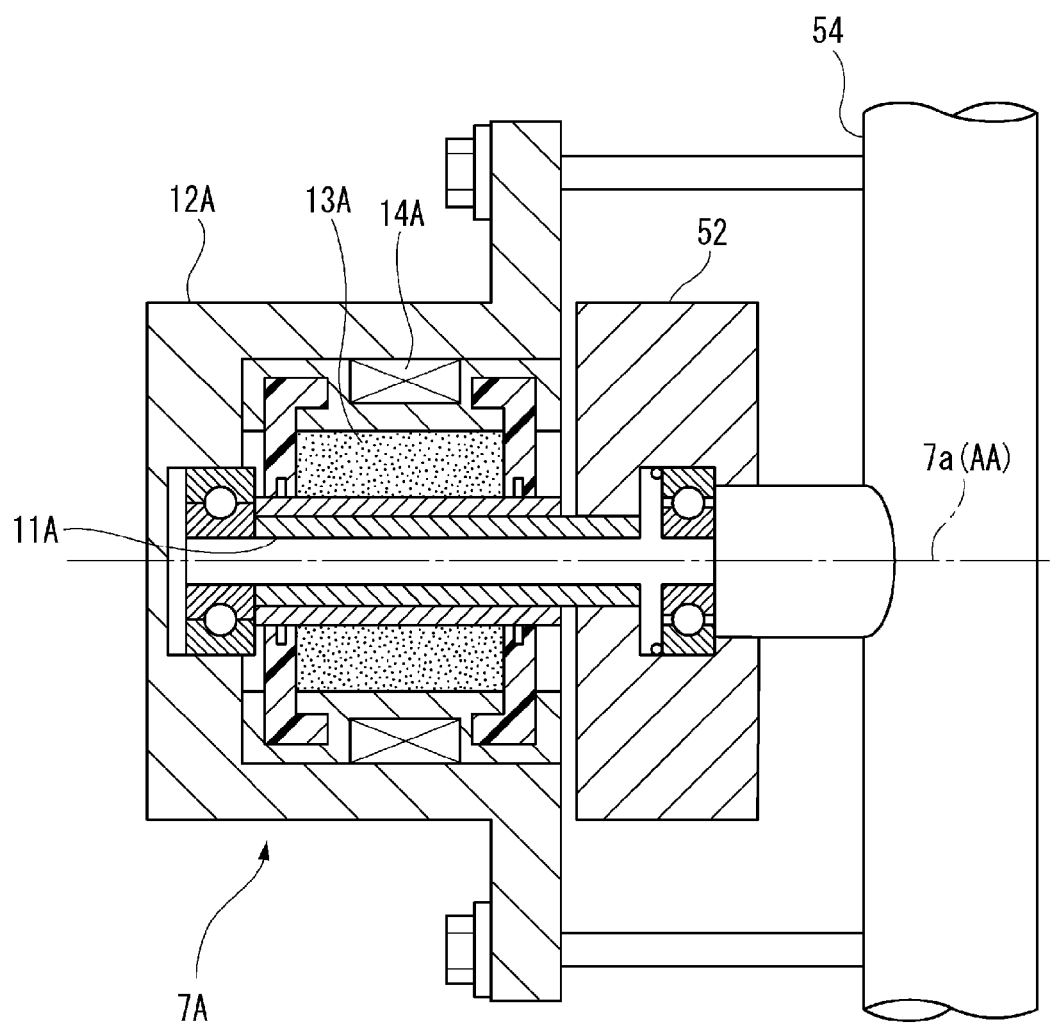
FIG. 13 is a vertical cross-sectional view of the resisting force change mechanism illustrated in FIGS. 12A and 12B.
Figure 13:
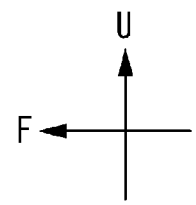

A resisting force change mechanism 7A of the second preferred embodiment will be described with reference to FIGS. 12A, 12B, and 13. FIGS. 12A and 12B are views illustrating the resisting force change mechanism 7A according to the second preferred embodiment of the present invention, and correspond to FIGS. 9A and 9B. FIG. 12A is a view of the resisting force change mechanism 7A when seen from the front in the direction of the upper middle axis AA. FIG. 12B is a view of the resisting force change mechanism 7A illustrated in FIG. 12A when seen from the top of the body frame 21. FIG. 13 is a vertical cross-sectional view of the resisting force change mechanism 7A.

The resisting force change mechanism 7A of the present preferred embodiment includes a magnetic fluid brake mechanism. A magnetic fluid brake mechanism is disclosed in Japanese Patent Unexamined Publication JP-A-2010-167999 and the like.

As illustrated in FIGS. 12A, 12B, and 13, the resisting force change mechanism 7A includes an outer cylinder 12A (an example of the second portion); a center shaft portion 11A (an example of the first portion) that is turnably provided inside of the outer cylinder 12A; magnetic fluid which is filled in a fluid chamber 13A provided between the outer cylinder 12A and the center shaft portion 11A; and a coil 14A. The magnetic fluid which is filled in the fluid chamber 13A is a fluid of which viscosity properties change due to a magnetic field. The outer cylinder 12A and the center shaft portion 11A turn relative to each other about the resisting force change axis 7a which is parallel or substantially parallel with an upper central axis. In the present preferred embodiment, the resisting force change axis 7a coincides with the lower left axis which is the center of relative turning between the left side member 54 and the lower cross member 52. The resisting force change mechanism 7A changes the viscosity of the magnetic fluid by applying a magnetic field with the coil 14A.

In the resisting force change mechanism 7A of the present preferred embodiment, the center shaft portion 11A is fixed to the lower cross member 52. The outer cylinder 12A is fixed to the left side member 54. For this reason, the outer cylinder 12A turns with respect to the center shaft portion 11A about the resisting force change axis 7a in synchronization with the turning of the left side member 54 relative to the lower cross member 52.

When the body frame 21 leans, the left side member 54 turns with respect to the lower cross member 52 about the lower left axis. For this reason, the outer cylinder 12A turns with respect to the center shaft portion 11A in synchronization with the relative turning between the left side member 54 and the lower cross member 52. When the coil 14A changes the viscosity of the magnetic fluid, a resisting force against the relative turning between the outer cylinder 12A and the center shaft portion 11A is changed. Accordingly, the resisting force change mechanism 7A changes a resisting force against the relative turning between the left side member 54 and the lower cross member 52.

The outer cylinder 12A turns relative to the center shaft portion 11A about the resisting force change axis 7a which is parallel or substantially parallel with the upper middle axis AA. The resisting force change mechanism 7A changes the resisting force against the relative turning between the center shaft portion 11A and the outer cylinder 12A about the resisting force change axis 7a which is parallel or substantially parallel with the upper middle axis AA. Since the center shaft portion 11A and the outer cylinder 12A turn about the resisting force change axis 7a, the resisting force change mechanism 7A is unlikely to increase in size as seen in the direction of the upper middle axis AA.

Specifically, the center shaft portion 11A is fixed to one member (the lower cross member 52) of the link mechanism 5. The other member (the left side member 54) of the link mechanism 5 supports the outer cylinder 12A, and is turnably supported by one member (the lower cross member 52). Since the left side member 54 and the lower cross member 52 turn about the lower left axis, the left side member 54 and the lower cross member 52 are disposed close to each other when seen from the front in the direction of the upper middle axis AA. The center shaft portion 11A is fixed to the lower cross member 52 and the outer cylinder 12A is fixed to the left side member 54. It is possible to dispose the center shaft portion 11A and the outer cylinder 12A close to each other and it is possible to make the resisting force change mechanism 7A compact when seen from the front in the direction of the upper middle axis AA.

The left side member 54 and the lower cross member 52 of the link mechanism 5 turn relative to each other about the lower left axis which is parallel or substantially parallel with the upper middle axis AA. The center shaft portion 11A and the outer cylinder 12A of the resisting force change mechanism 7A turn relative to each other about the lower left axis which is parallel or substantially parallel with the upper middle axis AA. Since the movement direction of the members of the link mechanism 5 is parallel or substantially parallel with the movement direction of the members of the resisting force change mechanism 7A, the resisting force change mechanism 7A is prevented from interfering with the link mechanism 5. For this reason, it is possible to prevent interference between the resisting force change mechanism 7A and the link mechanism 5 and it is possible to prevent an increase in the size of the vehicle 1 even when equipped with the resisting force change mechanism 7A.

Furthermore, the center shaft portion 11A is fixed to one member (the lower cross member 52) of the link mechanism 5. The outer cylinder 12A is supported by the other member (the left side member 54) of the link mechanism 5. The center shaft portion 11A turns relative to the outer cylinder 12A in synchronization with the relative turning between one member and the other member of the link mechanism 5.

The link mechanism 5 includes members such as the left side member 54 and the lower cross member 52 which turn relative to each other. Since the center shaft portion 11A and the outer cylinder 12A of the resisting force change mechanism 7A are respectively provided on the members of the link mechanism 5, the center shaft portion 11A and the outer cylinder 12A of the resisting force change mechanism 7A turn relative to each other in synchronization with the turning operation of the link mechanism 5. As such, the resisting force change mechanism 7A changes a resisting force against the relative turning between the center shaft portion 11A and the outer cylinder 12A by using the turning operation of the link mechanism 5. For this reason, it is possible to simplify the structure of the resisting force change mechanism 7A and it is possible to make the resisting force change mechanism 7A compact.

Third Preferred Embodiment

Subsequently, the third preferred embodiment of the present invention will be described with reference to FIGS. 14A to 16. Since only the resisting force change mechanism in the third preferred embodiment is different from that in the first preferred embodiment, the resisting force change mechanism will be mainly described. Each element which is the same as or similar to that of the first preferred embodiment is not illustrated. The same reference numbers are assigned to the same or similar elements, and the description thereof is omitted.

Figure 14A:
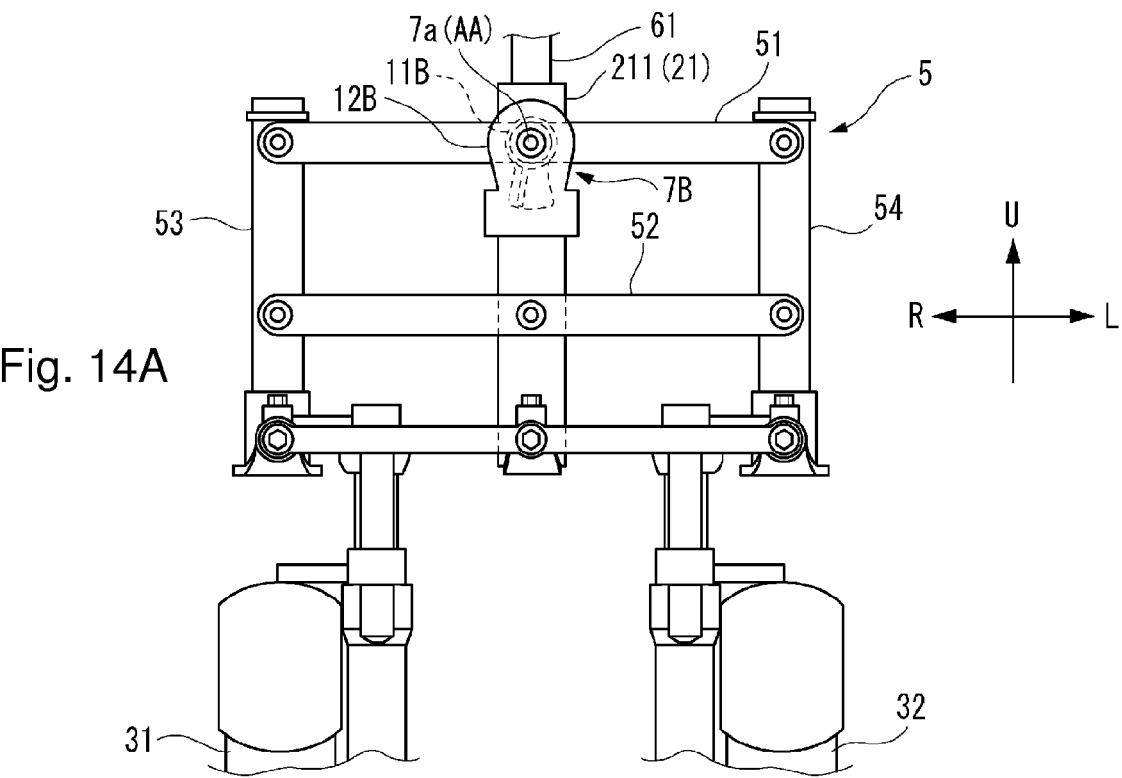
FIGS. 14A and 14B are views illustrating a resisting force change mechanism according to a third preferred embodiment of the present invention and corresponding to FIGS. 9A and 9B.
Figure 14B:
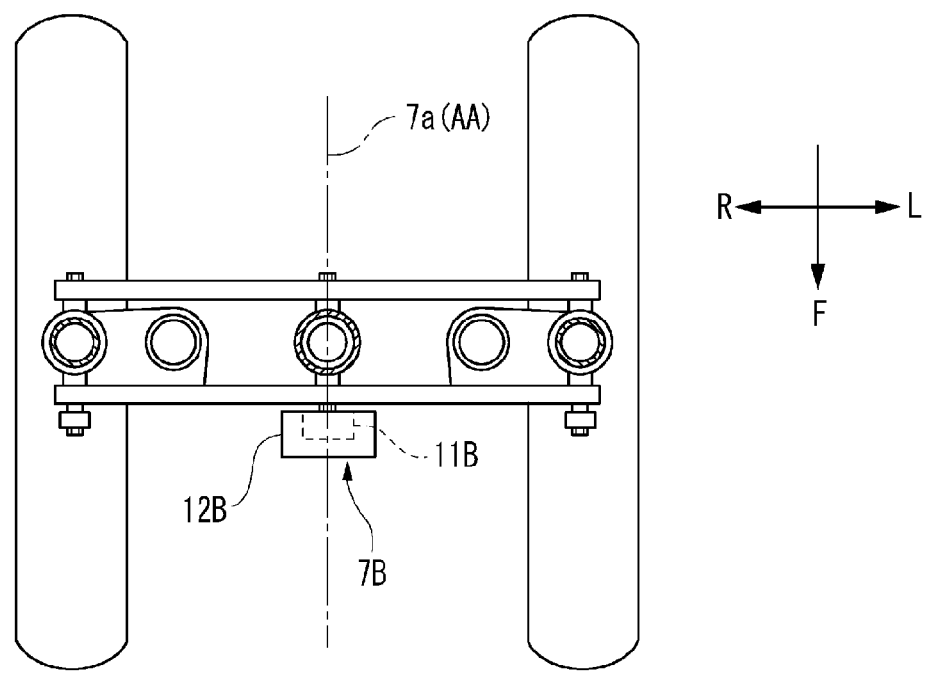
Figure 15:
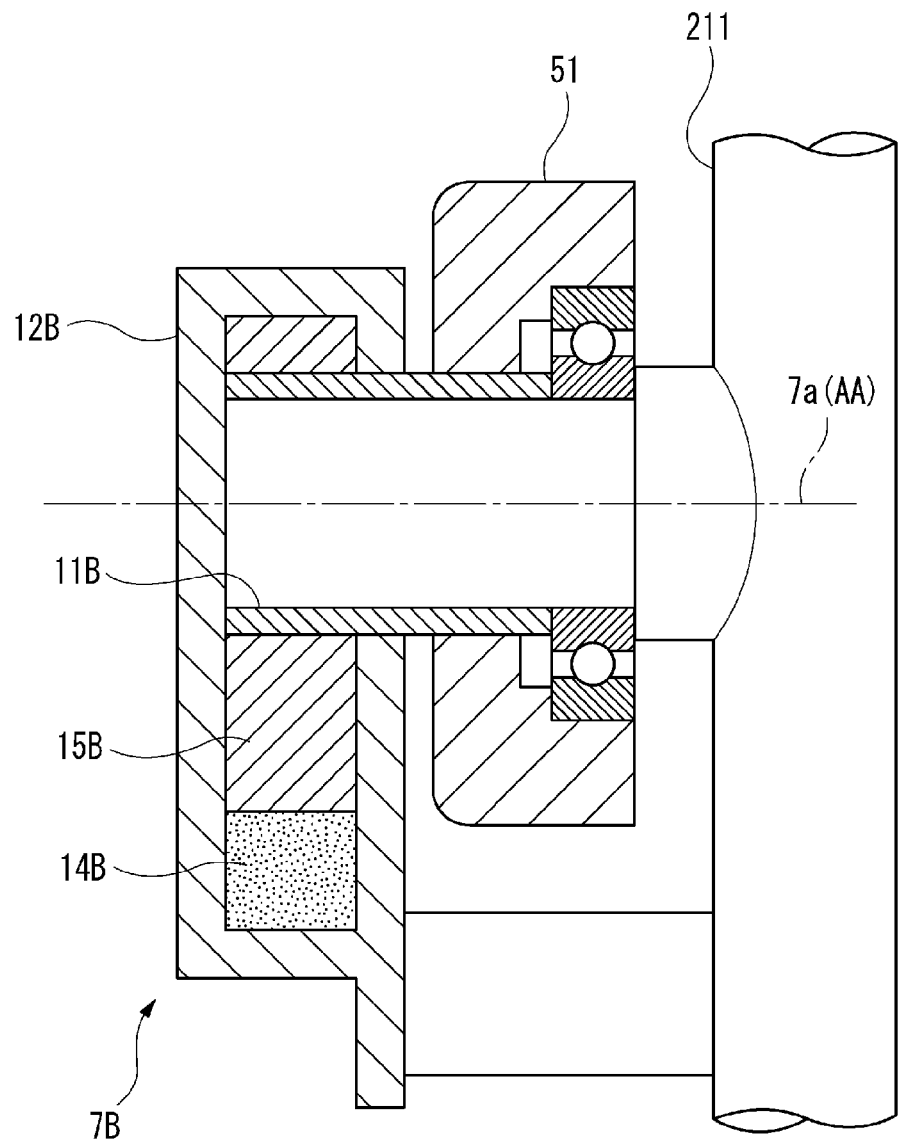
FIG. 15 is a vertical cross-sectional view of the resisting force change mechanism illustrated in FIGS. 14A and 14B.
Figure 15:
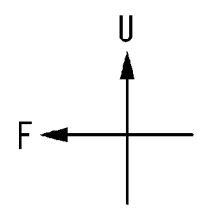
Figure 16:
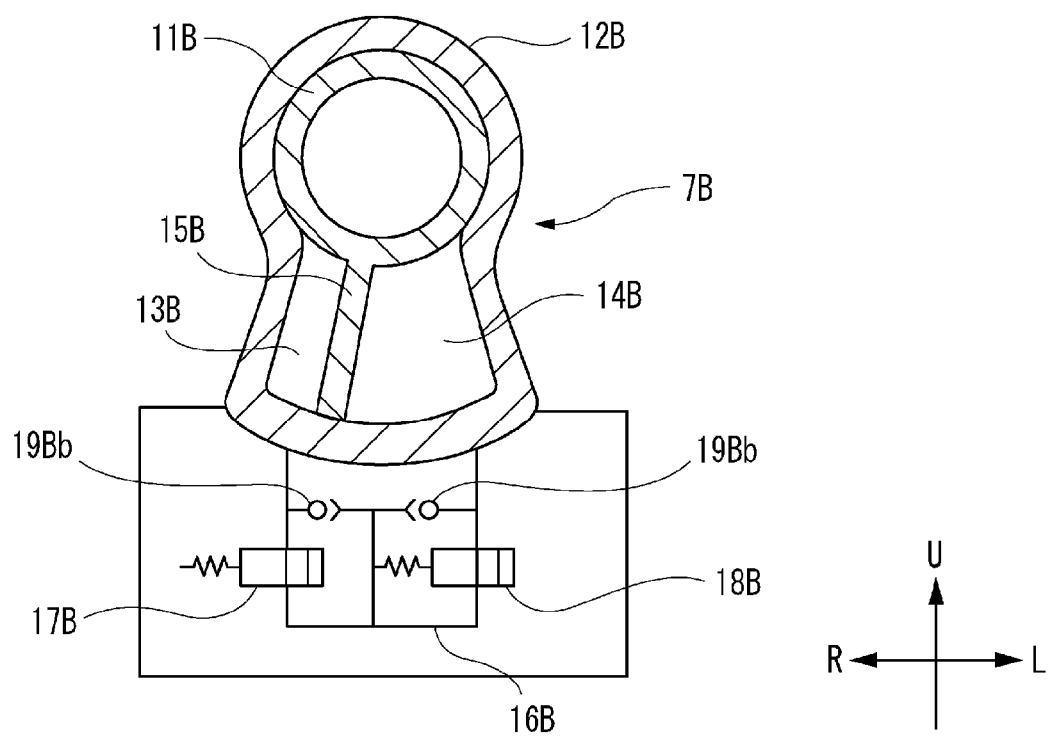
FIG. 16 is a schematic view illustrating an operational principle of the resisting force change mechanism illustrated in FIGS. 14A and 14B.

FIGS. 14A and 14B are views illustrating a resisting force change mechanism 7B according to the present preferred embodiment and correspond to FIGS. 9A and 9B. FIG. 14A is a view of the resisting force change mechanism 7B when seen from the front in the direction of the upper middle axis AA. FIG. 14B is a view of the resisting force change mechanism 7B illustrated in FIG. 14A when seen from the top of the body frame 21. FIG. 15 is a vertical cross-sectional view of the resisting force change mechanism 7B. FIG. 16 is a schematic view describing an operational principle of the resisting force change mechanism 7B.

The resisting force change mechanism 7B of the present preferred embodiment includes an oil rotary damping mechanism. An oil rotary damping mechanism is disclosed in Japanese Patent Unexamined Publication JP-A-2013-510053 and the like.

As illustrated in FIGS. 14A to 16, the resisting force change mechanism 7B includes a case 12B, and a center shaft portion 11B provided inside of the case 12B. The center shaft portion 11B is fixed to the upper cross member 51. The case 12B is fixed to the head pipe 211 which is a portion of the body frame 21. The center shaft portion 11B turns with respect to the case 12B about the resisting force change axis 7a that coincides with the upper middle axis AA.

As illustrated in FIGS. 15 and 16, a fluid chamber is provided between the case 12B and the center shaft 11B and is filled with a fluid. The fluid chamber is divided into a first fluid chamber 13B and a second fluid chamber 14B by a partition wall 15B that extends from the center shaft 11B. The partition wall 15B is in fluid contact with the fluid chamber.

As illustrated in FIG. 16, the first fluid chamber 13B and the second fluid chamber 14B are connected to each other via a communication path 16B that is provided in the case 12B. The communication path 16B is provided with a first one-way valve 19Ba, a second one-way valve 19Bb, a first normally closed solenoid valve 17B, and a second normally closed solenoid valve 18B.

When the first solenoid value 17B and the second solenoid valve 18B are closed, the fluid cannot move between the first fluid chamber 13B and the second fluid chamber 14B. For this reason, the center shaft portion 11B cannot turn with respect to the case 12B. That is, the upper cross member 51 cannot turn relative to the head pipe 211.

When the first solenoid valve 17B is open, the fluid is allowed to flow from the second fluid chamber 14B to the first fluid chamber 13B. For this reason, the center shaft portion 11B is allowed to turn relative to the case 12B only in the counter-clockwise direction. That is, the upper cross member 51 is allowed to turn with respect to the head pipe 211 only in the counter-clockwise direction when seen from the front.

When the second solenoid valve 18B is open, the fluid is allowed to flow from the first fluid chamber 13B to the second fluid chamber 14B. For this reason, the center shaft portion 11B is allowed to turn relative to the case 12B only in the clockwise direction when seen from the front. That is, the upper cross member is allowed to turn with respect to the head pipe 211 only in the clockwise direction.

When both the first solenoid valve 17B and the second solenoid valve 18B are open, the fluid flows from the first fluid chamber 13B to the second fluid chamber 14B and vice versa. For this reason, the center shaft portion 11B turns relative to the case 12B in the clockwise and counter-clockwise directions. That is, the upper cross member 51 turns relative to the head pipe 211 in the clockwise and counter-clockwise directions.

When an opening degree of each the first solenoid valve 17B and the second solenoid valve 18B is adjusted, the ease of movement of the fluid between the first fluid chamber 13B and the second fluid chamber 14B is adjusted, and the resisting force against the relative turning between the center shaft portion 11B and the case 12B is changed.

A driver adjusts the opening degree of each the first solenoid value 17B and the second solenoid valve 18B by operating an operation unit. For example, the operation unit includes an operation lever, an operation button, an operation switch, or the like. For example, the operation unit is provided on the handlebar 23.

Even in the present preferred embodiment, the center shaft portion 11B turns relative to the case 12B about the resisting force change axis 7a that coincides with the upper middle axis AA. The resisting force change mechanism 7B changes a resisting force against the relative turning between the center shaft portion 11B and the case 12B about the resisting force change axis 7a that coincides with the upper middle axis AA. Since the center shaft portion 11B and the case 12B turn about the resisting force change axis 7a, the resisting force change mechanism 7B is unlikely to increase in size as seen in the direction of the upper middle axis AA.

The center shaft portion 11B is fixed to one member (the upper cross member 51) of the link mechanism 5. The case 12B is supported by the other member (the body frame 21) that turnably supports one member (the upper cross member 51) of the link mechanism 5. Since the upper cross member 51 and the head pipe 211 turn about the upper middle axis AA, the upper cross member 51 and the head pipe 211 are disposed close to each other when seen from the front in the direction of the upper middle axis AA. The center shaft portion 11B is fixed to the upper cross member 51 and the case 12B is fixed to the head pipe 211. It is possible to dispose the center shaft portion 11B and the case 12B close to each other and it is possible to make the resisting force change mechanism 7B compact when seen from the front in the direction of the upper middle axis AA.

The upper cross member 51 and the head pipe 211 of the link mechanism 5 turn relative to each other about the upper middle axis AA. The center shaft portion 11B and the case 12B of the resisting force change mechanism 7B turn relative to each other about the upper middle axis AA. Since a movement direction of the members of the link mechanism 5 with respect to the head pipe 211 is parallel or substantially parallel with a movement direction of the members of the resisting force change mechanism 7B, the resisting force change mechanism 7B is prevented from interfering with the link mechanism 5. For this reason, it is possible to prevent interference between the resisting force change mechanism 7B and the link mechanism 5, and it is possible to prevent an increase in the size of the vehicle 1 even when equipped with the resisting force change mechanism 7B.

Furthermore, the center shaft portion 11B is fixed to one member (the upper cross member 51) of the link mechanism 5. The case 12B is supported by the head pipe 211. The center shaft portion 11B turns relative to the case 12B in synchronization with the relative turning between one member and the other member of the link mechanism 5.

The link mechanism 5 includes the members such as the left side member 54 and the lower cross member 52 which turn about the axis parallel or substantially parallel with the body frame 21. Since the center shaft portion 11B and the case 12B of the resisting force change mechanism 7B are respectively provided on the members of the link mechanism 5, the center shaft portion 11B and the case 12B of the resisting force change mechanism turn relative to each other in synchronization with a turning operation of the link mechanism 5. Accordingly, the resisting force change mechanism 7B changes the resisting force against the relative turning between the center shaft portion 11B and the case 12B by using the turning operation of the link mechanism 5. For this reason, it is possible to simplify the structure of the resisting force change mechanism 7B and it is possible to make the resisting force change mechanism 7B compact.

In the present preferred embodiment, each of an outer circumferential surface of the center shaft portion 11B and an inner circumferential surface of the case 12B has a circular or substantially circular shape when seen in the direction of the upper middle axis AA. For this reason, the outer circumferential surface of the case 12B easily has an arc or substantially arc shape defining an external appearance of the deformation force suppressing mechanism 7B, and it is possible to more effectively prevent the deformation force suppressing mechanism 7B from interfering with vehicle mounting components which are disposed around the circumference thereof.

In the present preferred embodiment, the resisting force change mechanism 7B overlaps the steering shaft 60 when seen in the direction of the upper middle axis AA. Since the steering shaft 60 is positioned at the center in the width direction of the vehicle 1, the resisting force change mechanism 7B is also positioned at the center in the width direction of the vehicle. For this reason, the resisting force change mechanism 7B is unlikely to protrude outward from a movable range of the link mechanism 5 as seen in the direction of the upper middle axis AA.

Fourth Preferred Embodiment

In the above-described preferred embodiments, the resisting force change axis preferably coincides with any one of the six turning axes (the upper right axis, the upper middle axis AA, the upper left axis, the lower right axis, the lower middle axis, and the lower left axis) of the link mechanism. The resisting force axis may deviate from the six turning axes of the link mechanism.

Figure 17A:
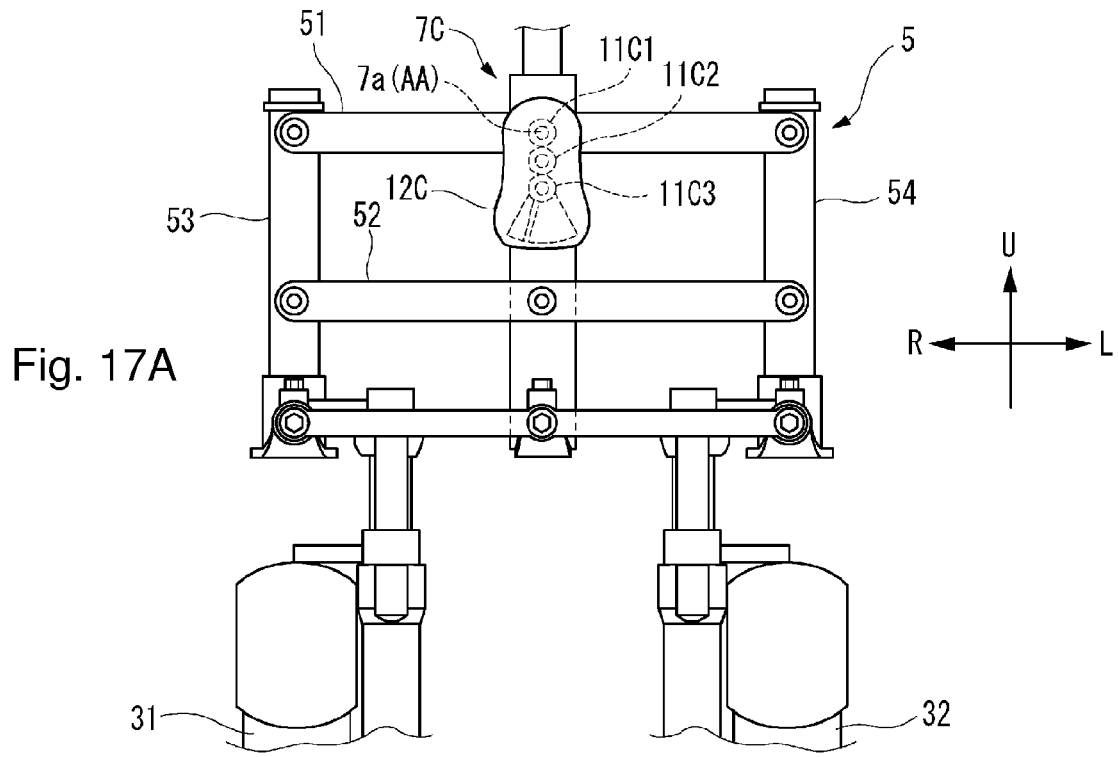
FIGS. 17A and 17B are views illustrating a resisting force change mechanism according to a fourth preferred embodiment of the present invention and corresponding to FIGS. 14A and 14B.
Figure 17B:
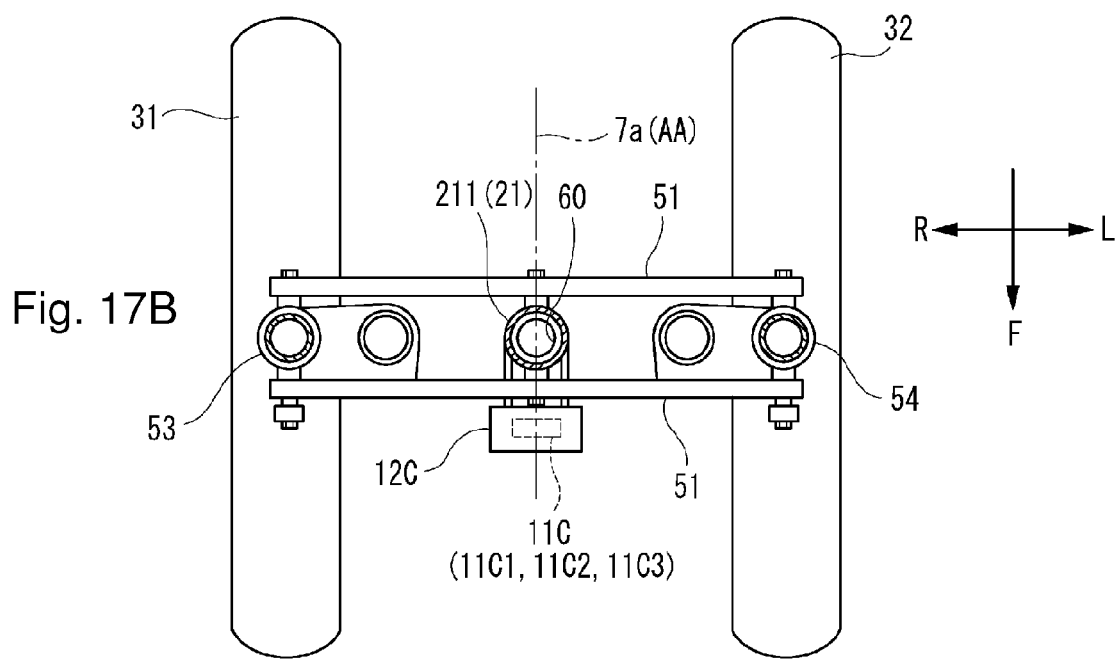

As illustrated in FIGS. 17A and 17B, a resisting force change mechanism 7C according to a fourth preferred embodiment of the present invention is a modified example of the third preferred embodiment. In the fourth preferred embodiment, the resisting force change axis 7a deviates to the right of the lower left axis. FIGS. 17A and 17B are views illustrating the resisting force change mechanism 7C according to a preferred embodiment of the present invention and corresponds to FIGS. 14A and 14B.

As illustrated in FIGS. 17A and 17B, the resisting force change mechanism 7C includes a case 12C as an example of the first portion, and an inner element 11C as an example of the second portion. The inner element 11C turns relative to the case 12C about the resisting force change axis 7a which is parallel or substantially parallel with the upper middle axis AA. The case 12C is fixed to the head pipe 211 which is a portion of the body frame 21.

The inner element 11C includes a first turning element 11C1, a second turning element 11C2, and a third turning element 11C3. Each of the first to third turning elements 11C1 to 11C3 turns about a turning axis which is parallel or substantially parallel with the upper middle axis AA. A gear is provided on an outer circumferential surface of each of the first to third turning elements 11C1 to 11C3 and thus a turning operation thereof is transmitted to each other.

The first turning element 11C1 is fixed to the upper cross member 51. The third turning member 11C3 is turnably supported by the case 12C. The third turning member 11C3 turns about the resisting force turning axis 7a that is parallel or substantially parallel with the upper middle axis AA and is positioned below the upper middle axis AA. The second turning element 11C2 is turnably supported by the case 12C, and transmits a turning operation of the first turning element 11C1 to the third turning element 11C3.

When the body frame 21 leans, a turning motion of the upper cross member 51 relative to the head pipe 211 is transmitted from the first turning element 11C1 to the third turning element 11C3. A resisting force is exerted against a relative turning between the third turning element 11C3 and the case 12 by the oil rotary damping mechanism that includes the third turning element 11C3 and the case 12C and is preferably the same as that of the third preferred embodiment described above. Accordingly, it is possible to suppress the leaning of the body frame 21.

Other Preferred Embodiments

In the above-described preferred embodiments, one of the drum brake mechanism, a magnetic fluid brake mechanism, and the oil rotary damping mechanism is used as the resisting force change mechanism. However, the present invention is not limited to the preferred embodiments described above. It is possible to use any well-known technology as the resisting force change mechanism insofar as it is possible to change a resisting force against a relative turning between the first and second portions. For example, it is possible to use a wet multiple disc brake structure as the resisting force change mechanism.

The resisting force change mechanism is preferably provided in the vicinity of any one of the six turning axes (the upper right axis, the upper middle axis AA, the upper left axis, the lower right axis, the lower middle axis, and the lower left axis) of the link mechanism 5.

Figure 18A:
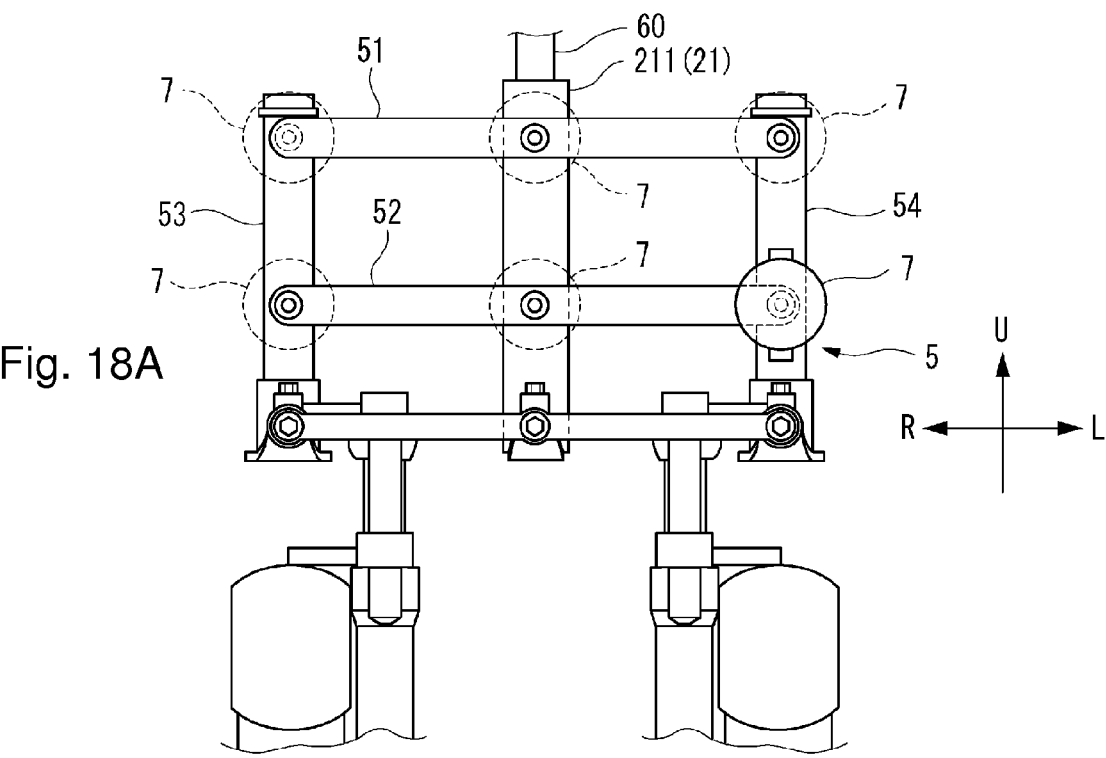
FIGS. 18A and 18B are views illustrating a position in which a plurality of the resisting force change mechanisms is provided and corresponding to FIGS. 9A and 9B.
Figure 18B:
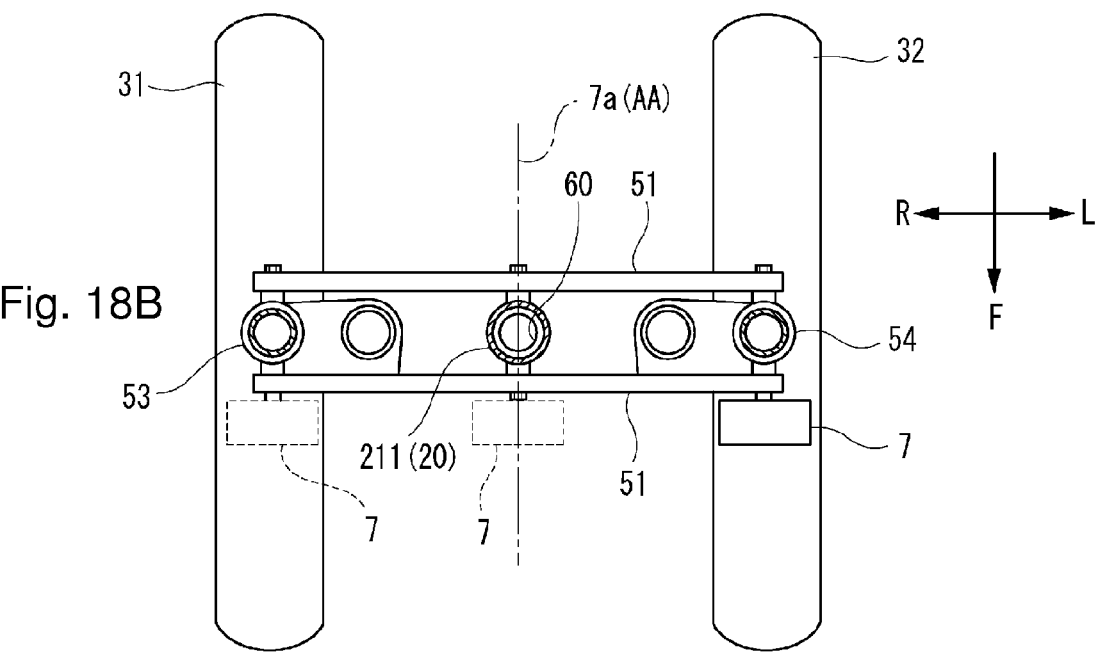

In the above-described preferred embodiments, a single resisting force change mechanism is provided in the vehicle, but the present invention is not limited to the preferred embodiments described above. As illustrated in FIGS. 18A and 18B, a plurality of the resisting force change mechanisms is provided in the vicinity of any one of the six turning axes (the upper right axis, the upper middle axis AA, the upper left axis, the lower right axis, the lower middle axis, and the lower left axis) of the link mechanism 5. FIGS. 18a and 18B are views illustrating a position in which the resisting force change mechanism is provided and corresponds to FIGS. 9A and 9B.

In the preferred embodiments described above, a portion of the link mechanism 5 is supported on the headpipe 211. However, as long as a portion of the link mechanism 5 is supported on the body frame 21, for example, a configuration may be used in which the down frame 212 supports a portion of the link mechanism 5.

In the preferred embodiments described above, the first shock absorbing device 33 and the second shock absorbing device 35 each preferably includes the telescopic shock absorber. However, the first shock absorbing device 33 and the second shock absorbing device 35 may each include a bottom-link shock absorber, for example.

Preferred embodiments of the present invention can be applied to a scooter-type straddle vehicle, for example, as long as the vehicle includes a body frame that can lean and two front wheels.

This application claims priority to Japanese Patent Application No. 2012-235605 filed on Oct. 25, 2012, the entire contents of which are incorporated herein by reference.

The terms and expressions that are used herein are used to describe the preferred embodiments of the present invention and hence should not be construed as limiting the scope of the present invention. It should be understood that any equivalents to the characteristic matters that are shown and described herein should not be excluded and that various modifications made within the scope of claims to be made later are permitted.

The present invention can be embodied in many different forms. This disclosure should be regarded as provision of the preferred embodiments based on the principle of the present invention. Based on the understanding that the preferred embodiments which are described and/or illustrated herein are not intended to limit the present invention thereto, several preferred embodiments are described and illustrated herein.

Several illustrated preferred embodiments of the invention are described herein. The present invention should not be limited to the preferred embodiments described herein. The present invention includes every preferred embodiment that includes equivalent elements, modifications, deletions, combinations (for example, combinations of characteristics that are common to various preferred embodiments), improvements and/or modifications that those skilled in the art to which the present invention pertains can recognize based on the disclosure made herein. A limited matter in a claim should be construed widely based on a word or words used in the claim and should not be limited to the preferred embodiments that are described in this specification or preferred embodiments that are described during prosecution of this patent application. Such preferred embodiments are interpreted to be non-exclusive. For example, in this disclosure, the terms "preferred" and "preferable" are non-exclusive terms and mean that "it is preferred but does not impose any limitation thereon" and "it is preferable but does not impose any limitation thereon".

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A vehicle comprising:
a body frame;
a right front wheel and a left front wheel aligned side by side in a left-and-right direction of the body frame;
a right shock absorbing device supporting the right front wheel at a lower portion thereof and configured to absorb a displacement of the right front wheel in an up-and-down direction of the body frame in relation to an upper portion thereof;
a left shock absorbing device supporting the left front wheel at a lower portion thereof and configured to absorb a displacement of the left front wheel in the up-and-down direction of the body frame in relation to an upper portion thereof;
a link mechanism including:
a right side member supporting the upper portion of the right shock absorbing device so as to turn about a right steering axis extending in the up-and-down direction of the body frame;
a left side member supporting the upper portion of the left shock absorbing device so as to turn about a left steering axis that is parallel or substantially parallel to the right steering axis;
an upper cross member supporting an upper portion of the right side member at a right end portion thereof so as to turn about an upper right axis extending in a front-and-rear direction of the body frame, supporting an upper portion of the left side member at a left end portion thereof so as to turn about an upper left axis parallel or substantially parallel to the upper right axis, and supported on the body frame at a middle portion thereof so as to turn about an upper middle axis parallel or substantially parallel to the upper right axis and the upper left axis; and
a lower cross member supporting a lower portion of the right side member at a right end portion thereof so as to turn about a lower right axis parallel or substantially parallel to the upper right axis, supporting a lower portion of the left side member at a left end portion thereof so as to turn about a lower left axis parallel or substantially parallel to the upper left axis, and supported on the body frame at a middle portion thereof so as to turn about a lower middle axis parallel or substantially parallel to the upper middle axis;
a steering shaft supported on the body frame between the right side member and the left side member in the left-and-right direction of the body frame, and including an upper end portion provided above the lower middle axis in the up-and-down direction of the body frame and configured to turn about a middle steering axis extending in the up-and-down direction of the body frame;
a handlebar provided at the upper end portion of the steering shaft;
a turn transfer mechanism configured to transfer a turning motion of the steering shaft according to an operation of the handlebar to the right shock absorbing device and to the left shock absorbing device; and
a resisting force change mechanism configured to change a resisting force exerted against turning operations of the upper cross member and the lower cross member with respect to the body frame, and to change a resisting force which occurs when the upper cross member and the lower cross member are displaced from respective positions relative to the body frame in at least two different magnitudes; wherein
the resisting force change mechanism includes a first portion and a second portion that turn relative to each other about a resisting force change axis parallel or substantially parallel with the upper middle axis and that change a resisting force against the relative turning;
the first portion is non-turnably fixed to one member of the right side member, the left side member, the upper cross member, the lower cross member, and the body frame; and
the second portion is supported by the other member of the right side member, the left side member, the upper cross member, the lower cross member, and the body frame, at least a portion of which is turnably supported by the one member, and the second portion is configured to turn relative to the first portion about the resisting force change axis in synchronization with a turning of the one member relative to the other member.

2. The vehicle according to claim 1, wherein the resisting force change axis coincides with a turning axis of the one member and the other member.

3. The vehicle according to claim 2, wherein the one member includes a shaft portion that turnably supports the other member about the turning axis parallel or substantially parallel with the upper middle axis, and the first portion is fixed to the shaft portion.

4. The vehicle according to claim 1, wherein the first portion includes a first surface extending in a direction of the resisting force change axis;
the second portion includes a second surface that extends in the direction of the resisting force change axis and that faces the first surface; and
the resisting force change mechanism is configured to change a resisting force between the first surface and the second surface.

5. The vehicle according to claim 4, wherein at least a portion of each of the first and second surfaces includes an arc shape when seen in a direction of the upper middle axis.

6. The vehicle according to claim 4, wherein each of the first and second surfaces has a circular or substantially circular shape when seen in the direction of the upper middle axis.

7. The vehicle according to claim 1, wherein the resisting force change mechanism overlaps the steering shaft when seen in the direction of the upper middle axis.

8. The vehicle according to claim 1, further comprising magnetic fluid in which shearing resisting force is changeable retained between the first and second portions.

9. The vehicle according to claim 1, wherein the resisting force change mechanism includes a first fluid chamber, of which volume is changed corresponding to a relative turning between the first and second portions, and a second fluid chamber communicating with the first fluid chamber via a communication path; and
a movement of the fluid between the first and second fluid chambers is controlled by adjusting a degree of opening and closing of the communication path to changes the resisting force against a relative turning between the first portion and the second portion.

10. The vehicle according to claim 1, wherein the resisting force change mechanism includes a drum brake mechanism;
the second portion includes a drum; and
the first portion includes a shoe provided inside the drum and configured to come into contact with an inner circumferential surface of the drum.

11. The vehicle according to claim 1, wherein a plurality of the resisting force change mechanisms is provided.

\* \* \* \* \*